US008955020B2

(12) United States Patent
Bennett et al.

(10) Patent No.: US 8,955,020 B2
(45) Date of Patent: Feb. 10, 2015

(54) TRANSCODING AND DATA RIGHTS MANAGEMENT IN A MOBILE VIDEO NETWORK WITH STB AS A HUB

(75) Inventors: James D. Bennett, San Clemente, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1475 days.

(21) Appl. No.: 11/328,673

(22) Filed: Jan. 10, 2006

(65) Prior Publication Data
US 2006/0117379 A1 Jun. 1, 2006

Related U.S. Application Data

(63) Continuation-in-part of application No. 10/675,110, filed on Sep. 30, 2003, now Pat. No. 7,296,295.

(60) Provisional application No. 60/470,960, filed on May 15, 2003, provisional application No. 60/443,897, (Continued)

(51) Int. Cl.
*H04N 7/18* (2006.01)
*H04N 7/10* (2006.01)
(Continued)

(52) U.S. Cl.
CPC .......... *H04L 29/06027* (2013.01); *H04N 7/141* (2013.01); *H04N 7/163* (2013.01); *H04N 7/18* (2013.01); *H04N 21/2343* (2013.01); *H04N 21/234363* (2013.01); *H04N 21/2408* (2013.01); *H04N 21/254* (2013.01); *H04N 21/2541* (2013.01); *H04N 21/2543* (2013.01); *H04N 21/25435* (2013.01); *H04N 21/25833* (2013.01);
(Continued)

(58) Field of Classification Search
USPC ..................................... 725/78, 31
See application file for complete search history.

(56) References Cited

U.S. PATENT DOCUMENTS 7,504,968 B2 * 3/2009 Wee et al. ......... 341/50
2002/0120851 A1 * 8/2002 Clarke ............ 713/178
(Continued)

Primary Examiner — Nasser Goodarzi
Assistant Examiner — Fred Peng
(74) Attorney, Agent, or Firm — Garlick & Markison; Holly L. Rudnick

(57) ABSTRACT

A home entertainment system that employs DRM (Data Rights Management) data protected multimedia programs and rights management component (RMC), with corresponding hardware and software systems incorporated in to home entertainment systems, to protect rights of the media program providers and the users. The system employs STB (Set Top Box) as a hub. The rights management component is incorporated in to the set top box (STB Circuitry), as well as some of the media devices. Three operational scenarios are envisaged regarding the home entertainment system. The first operational scenario involves a remote media source and the media device interaction via STB Circuitry; where as the STB Circuitry performs the duty of a mediator. The second operational scenario involves remote media source and the media device interaction via STB Circuitry, where as the STB Circuitry having rights to reissue licenses to media players. The third operational scenario involves local media sources incorporating the RMC and interacting with the STB Circuitry to decrypt and transcode the multimedia programs. Further, the STB Circuitry interacts with a remote billing server via the communication network regarding presentation rights, to interact with a user regarding the presentation rights, and to arrange for payment for the presentation rights.

23 Claims, 13 Drawing Sheets

Related U.S. Application Data filed on Jan. 30, 2003, provisional application No. 60/444,099, filed on Jan. 30, 2003, provisional application No. 60/443,996, filed on Jan. 30, 2003, provisional application No. 60/444,243, filed on Jan. 30, 2003, provisional application No. 60/464,711, filed on Apr. 23, 2003, provisional application No. 60/457,179, filed on Mar. 25, 2003, provisional application No. 60/467,867, filed on May 5, 2003, provisional application No. 60/467,990, filed on May 5, 2003, provisional application No. 60/432,472, filed on Dec. 11, 2002, provisional application No. 60/443,894, filed on Jan. 30, 2003.

(51) Int. Cl.

| | |
|---|---|
| H04N 7/025 | (2006.01) |
| H04L 29/06 | (2006.01) |
| H04N 7/14 | (2006.01) |
| H04N 7/16 | (2011.01) |
| H04N 21/2343 | (2011.01) |
| H04N 21/24 | (2011.01) |
| H04N 21/254 | (2011.01) |
| H04N 21/2543 | (2011.01) |
| H04N 21/258 | (2011.01) |
| H04N 21/262 | (2011.01) |
| H04N 21/2668 | (2011.01) |
| H04N 21/2743 | (2011.01) |
| H04N 21/41 | (2011.01) |
| H04N 21/414 | (2011.01) |
| H04N 21/4227 | (2011.01) |
| H04N 21/426 | (2011.01) |
| H04N 21/431 | (2011.01) |
| H04N 21/433 | (2011.01) |
| H04N 21/436 | (2011.01) |
| H04N 21/4363 | (2011.01) |
| H04N 21/442 | (2011.01) |
| H04N 21/45 | (2011.01) |
| H04N 21/458 | (2011.01) |
| H04N 21/462 | (2011.01) |
| H04N 21/4627 | (2011.01) |
| H04N 21/466 | (2011.01) |
| H04N 21/472 | (2011.01) |
| H04N 21/475 | (2011.01) |
| H04N 21/4788 | (2011.01) |
| H04N 21/482 | (2011.01) |
| H04N 21/488 | (2011.01) |
| H04N 21/61 | (2011.01) |
| H04N 21/63 | (2011.01) |
| H04N 21/658 | (2011.01) |
| H04N 21/6583 | (2011.01) |
| H04N 21/81 | (2011.01) |
| H04L 29/08 | (2006.01) |
| H04L 12/28 | (2006.01) |

(52) U.S. Cl.
CPC ... *H04N 21/25875* (2013.01); *H04N 21/26266* (2013.01); *H04N 21/2668* (2013.01); *H04N 21/2743* (2013.01); *H04N 21/4126* (2013.01); *H04N 21/41422* (2013.01); *H04N 21/4227* (2013.01); *H04N 21/42684* (2013.01); *H04N 21/4316* (2013.01); *H04N 21/4331* (2013.01); *H04N 21/43615* (2013.01); *H04N 21/43637* (2013.01); *H04N 21/44222* (2013.01); *H04N 21/4532* (2013.01); *H04N 21/458* (2013.01); *H04N 21/4622* (2013.01); *H04N 21/4627* (2013.01); *H04N 21/4668* (2013.01); *H04N 21/47214* (2013.01); *H04N 21/4751* (2013.01); *H04N 21/4755* (2013.01); *H04N 21/4788* (2013.01); *H04N 21/482* (2013.01); *H04N 21/4821* (2013.01); *H04N 21/4826* (2013.01); *H04N 21/4882* (2013.01); *H04N 21/6125* (2013.01); *H04N 21/6187* (2013.01); *H04N 21/632* (2013.01); *H04N 21/6582* (2013.01); *H04N 21/6583* (2013.01); *H04N 21/814* (2013.01); *H04N 21/8146* (2013.01); *H04L 65/4076* (2013.01); *H04L 65/4084* (2013.01); *H04L 65/604* (2013.01); *H04L 65/80* (2013.01); *H04L 65/1026* (2013.01); *H04L 67/06* (2013.01); *H04L 67/306* (2013.01); *H04L 67/325* (2013.01); *H04L 67/327* (2013.01); *H04L 12/2803* (2013.01); *H04L 12/2834* (2013.01); *H04L 2012/2841* (2013.01); *H04L 2012/2849* (2013.01)
USPC .............. 725/85; 725/74; 725/80; 725/25; 725/31

(56) References Cited

U.S. PATENT DOCUMENTS

| | | | |
|---|---|---|---|
| 2003/0056212 A1* | 3/2003 | Siegel et al. | 725/31 |
| 2004/0010800 A1* | 1/2004 | Goci | 725/78 |
| 2004/0022222 A1* | 2/2004 | Clisham | 370/338 |
| 2004/0172658 A1* | 9/2004 | Rakib et al. | 725/120 |
| 2005/0086694 A1* | 4/2005 | Hicks et al. | 725/79 |
| 2006/0259852 A1* | 11/2006 | Upendran et al. | 715/500.1 |
| 2007/0220279 A1* | 9/2007 | Northcutt et al. | 713/193 |

* cited by examiner

TRANSCODING AND DATA RIGHTS MANAGEMENT IN A MOBILE VIDEO NETWORK WITH STB AS A HUB

CROSS REFERENCES TO PRIORITY APPLICATIONS

This application is a continuation-in-part of U.S. Utility application Ser. No. 10/675,110, entitled "Media Processing System Supporting Different Media Formats via Server-Based Transcoding" and filed Sep. 30, 2003, now U.S. Pat. No. 7,296,295 which claims priority to and claims benefit from" U.S. Patent Application Ser. No. 60/470,960, entitled "Media Processing System Supporting Different Media Formats via Server-Based Transcoding" and filed on May 15, 2003; U.S. Patent Application Ser. No. 60/443,897, entitled "Media Processing System Providing Access to Distributed Media via a Channel Guide" and filed on Jan. 30, 2003; U.S. Patent Application Ser. No. 60/444,099, entitled "Media Channel Setup in a Media Exchange Network" and filed on Jan. 30, 2003; U.S. Patent Application Ser. No. 60/443,996, entitled "Media Processing System Automatically Offering Access to Newly Available Media in a Media Exchange Network" and filed on Jan. 30, 2003; U.S. Patent Application Ser. No. 60/444,243, entitled "Migration of Stored Media Through a Media Exchange Network" and filed on Jan. 30, 2003; U.S. Patent Application Ser. No. 60/464,711, entitled "Automated Routing and Consumption of Media Through a Media Exchange Network" and filed on Apr. 23, 2003; U.S. Patent Application Ser. No. 60/457,179, entitled "Server Architecture Supporting a Personal Media Exchange Network" and filed on Mar. 25, 2003; U.S. Patent Application Ser. No. 60/467,867, entitled "Billing Support in a Media Exchange Network" and filed on May 5, 2003; U.S. Patent Application Ser. No. 60/467,990, entitled "Media Processing System Supporting Adaptive Digital Media Parameters Based On End-User Viewing Capabilities" and filed on May 5, 2003; U.S. Patent Application Ser. No. 60/432,472, entitled "Personal Inter-Home Media Exchange Network" and filed on Dec. 11, 2002; and U.S. Patent Application Ser. No. 60/443,894, entitled "Access and Control of Media Peripherals Via a Media Processing System" and filed on Jan. 30, 2003. The complete subject matter of the above-identified applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention generally relates to audio/video systems within a home and associated media delivery and listening/viewing rights management.

2. Related Art

Media presentation devices (media players) typically include a video display and a corresponding sound system. Examples of media presentation devices include televisions, computers, pocket televisions, cell phones, PDAs (Personal Digital Assistants), projectors, PSPs (Portable Play Stations), digital watches, and audio systems. Media presentation devices typically receive media content from media sources such as cable Set-Top-Box (STBs), satellite STBs, Digital Video Disk (DVD) players, Personal Video Recorders (PVRs), computers, and wireless broadcast television receivers, among other sources. These media sources provide media programs to the media presentation devices for presentation to a consumer.

The pre-recorded or live media programs (i.e., video programs, audio-video programs and audio programs) are usually copyright protected. Either being unaware of the copyrights of the multimedia program providers or deliberately abusing the copyrights, many consumers engage in the unauthorized copying, distributing, and/or viewing of the copyright protected media programs. Such illegal use of the media programs causes the copyright owners of the media programs to not receive royalties for such use.

In a point to point digital rights management situation, a single device makes a media presentation request, and, in response, licensing, billing and other rights management are processed directly. When encryption is employed for digital rights management, often the encryption is not end-to-end in point-to-point media management systems. Once the media program is decrypted, theft and unauthorized distribution is a discreet possibility.

In a situation where there are multiple media presentation devices, within a single home environment for example, it becomes necessary to download media programs multiple times, each with a media format suited for that particular device with digital rights management operations performed for each viewing. Thus, a need exists for improvements in the protection of media programs to prevent the unauthorized use, copying and distribution of the media programs.

BRIEF SUMMARY OF THE INVENTION

A home entertainment system includes DRM (Data Rights Management) structure and operations to protect media programs, including video programs, audio programs, and audio/video programs. The DRM structure includes hardware and software incorporated into home entertainment systems. Local DRM structure operates in cooperation with remote devices such as DRM servers to perform the DRM operations.

The home entertainment system includes a media storage device communicatively coupled to the home entertainment system network, media player, and Set Top Box Circuitry (STB circuitry). The media storage is employed to store downloaded multimedia programs. The STB circuitry communicatively couples to a remote digital rights management server via a communication network, and the STB circuitry operable to interact with the remote digital rights management server to limit consumption of the stored media program by the media player.

The STB circuitry retrieves the media program from a remote media source via a home entertainment communication network, to encrypt the media program respective to the media player, and to deliver the encrypted media program to the media player. The media player receives the encrypted media program, decrypts the encrypted media program, and presents the media program. The media storage device receives the media program in the format that has been encrypted respective to the media player, stores the media program in the format that has been encrypted respective to the media player and delivers the media program in the format that has been encrypted respective to the media player to the media player.

There are three operational scenarios envisaged regarding the home entertainment system. The first operational scenario involves remote media source and the media device interaction via STB circuitry, where the STB circuitry performs the duty of a mediator. The second operational scenario involves remote video source and media device interaction via STB circuitry, where as the STB circuitry having rights to reissue licenses to media players. The third operational scenario involves local media sources incorporating the rights management component (RMC) and interacting with the STB circuitry to decrypt and transcode the multimedia programs. Further, the STB circuitry interacts with a remote billing server via the communication network regarding presentation rights, interacts with a user regarding the presentation rights, and arranges payment for the presentation rights.

The media devices may also employ removable storage devices such as a DVD, containing DRM data protected media programs. The media device produces the media program in an encrypted format. The STB circuitry is interacts with remote digital rights management server via the home entertainment communication network to obtain decryption information. Then, the STB circuitry decrypts the media program using the decryption information and re-encrypt the media program respective to the media device. Finally, the STB circuitry delivers the encrypted media program to the media player. The media player decrypts the re-encrypted program and displays the media program.

Features and advantages of the present invention will become apparent from the following detailed description of the invention made with reference to the accompanying drawings.

DETAILED DESCRIPTION OF THE INVENTION

Figure 1:
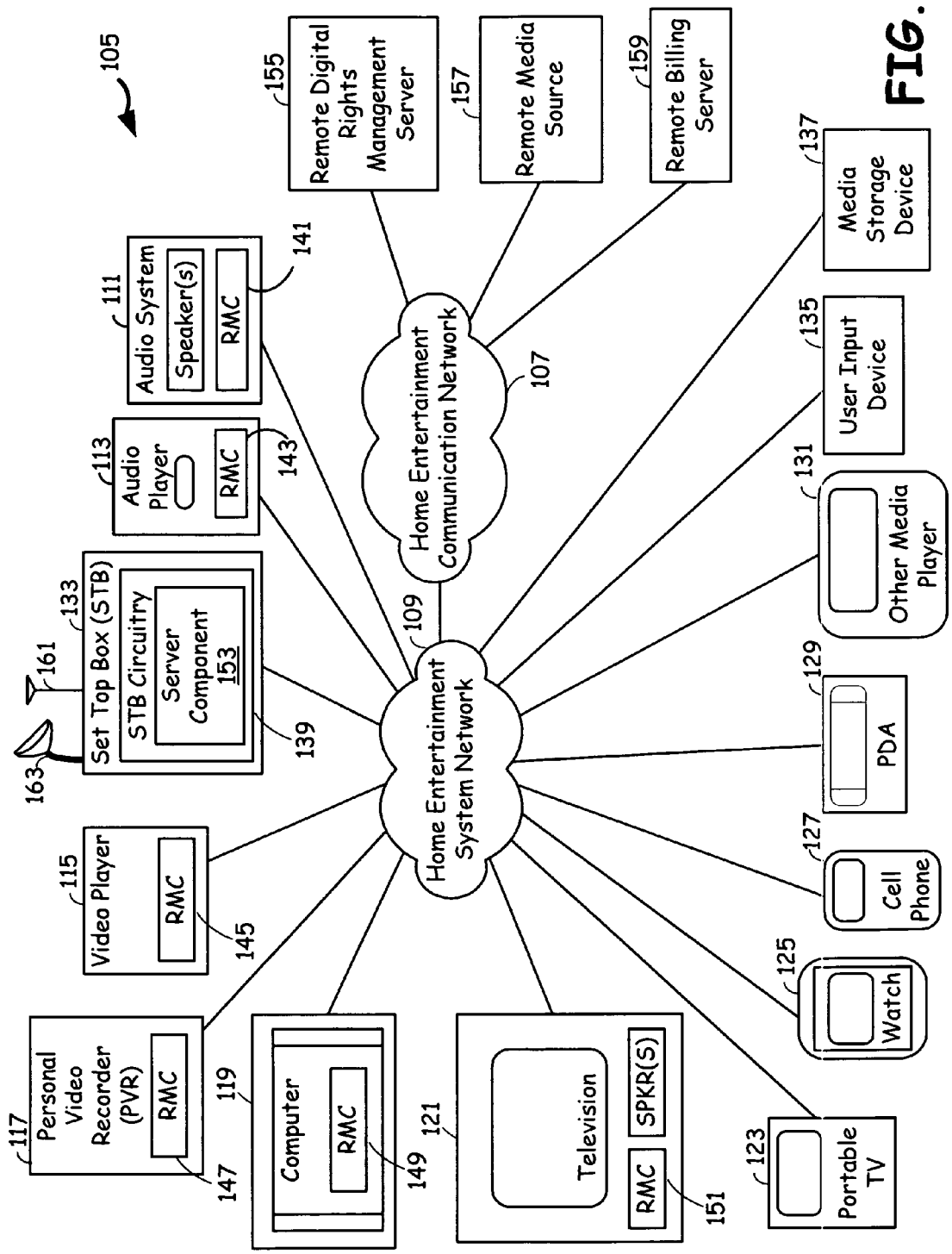
FIG. 1 illustrates a home entertainment infrastructure in which a plurality of components of rights management components (RMC) built into a set top box (STB) and various types of media source equipment for protecting media rights of the media program providers, in accordance with the present invention.

FIG. 1 illustrates a home entertainment infrastructure 105 in which a plurality of components of rights management components (RMC) built into a set top box (STB) and various types of media source equipment for protecting media rights of the media program providers, in accordance with the present invention. The home entertainment infrastructure comprises of a home entertainment system network 109 to which a plurality of media players and local media sources are communicatively connected and a home entertainment communication network 107 that connect local media players to a group of media program provider's servers. The media players include a portable television 123, digital watch 125, cell phone 127, personal digital assistant (PDA) 129 and other media player 131. The local media sources with audio and/or video functionality include an audio system 111, audio player 113, video player 115, personal video recorder 117, personal computer 119, television (TV) 121, and set top box 133. Some of the media sources such as a computer 119, television 121, and audio system 111 belong to both categories of media sources and media players; and are able to source and play media programs. The other media player 131 may include a digital video projector, personal video device, portable game unit and industry standard or proprietary media players with audio and/or video functionalities. Further, the home entertainment system network 109 communicatively couples to a user input device 135 that allows user to provide information regarding user credentials, and download media programs and to a media storage device 137 that allows storing of media programs.

The media program provider's servers serve encrypted media program via home entertainment communication network 107 and home entertainment system network 109, maintain a database of user registrations and bill users for the encrypted media programs on pay-per-view basis. The multimedia program provider's servers and/or sources include a remote digital rights management server 155, remote media source 157, and remote billing server 159. The multimedia program provider's servers and/or sources 155, 157 and 159 are remotely placed as part of home entertainment infrastructure 105, here onwards together referred to as a multimedia program provider's servers/sources, may be a single unit or may be distributed along the infrastructure. The remote media source 157 represents many types of media program sources, such as one or more of Internet based servers, cable, fiber and satellite service providers, wireless radio, television broadcasters and industry standard or proprietary networks or links.

In accordance with the present invention, in the home entertainment infrastructure 105, the set top box 133 performs the function of a rights management hub and consists of a STB circuitry 139. The STB circuitry 139 further contains a server component 153 that serves encrypted media programs, here afterwards referred to as DRM data protected media programs, to various media players 111, 119, 121, 123, 125, 127, 129 and 131; and thus protects the rights of the multimedia program providers as well as the users. Either portions of or entire STB circuitry 141, 143, 145, 147, 149 and 151 are also incorporated into media sources 111, 113, 115, 117, 119 and 121 respectively, referred here onwards as rights management component (RMC).

The home entertainment communication network 107 communicatively couples media program provider's servers to the media players and/or sources 111, 113, 115, 117, 119, 121, 123, 125, 127, 129, 131, and 133. The home entertainment communication network 107 supports all communication exchanges between the various blocks of FIG. 1, via home entertainment system network 109. For example, the remote media source 157 serves broadcast television channel in an encrypted format via the home entertainment communication network 109. When the remote media source 157 comprises a cable service provider, the home entertainment communication network 107 comprises a coaxial cable infrastructure that communicatively couples the remote media source 157 to the STB 133. Similarly, to support fiber, satellite or roof top antenna television broadcasts, the home entertainment communication network 107 comprise a fiber and wireless infrastructure. The home entertainment communication network 107 also comprise wired and wireless, short and long range links and networks, as well as any combinations thereof between any two of the illustrated elements.

The STB 133 receives media programs from the remote media server 157 via a satellite dish 163, roof top antenna 161, cable infrastructure, fiber optic and twisted-pair telephony infrastructures. Twisted-pair telephony infrastructure may utilize ISDN, DSL, or other industry standard or proprietary protocol. The home entertainment system network 109 may comprise of wired local area network (LAN), wireless local area network (WLAN) or other industry standard or proprietary communicative coupling network.

According to the present invention, the multimedia program provider's servers/sources 155, 157, and/or 159 may employ one of many possible ways to deliver media programs. The multimedia program provider's servers/sources 155, 157, and/or 159 determine the final approach used. The multimedia program provider's servers/sources 155, 157 and/or 159 specify a minimum level of digital rights management and the STB 133 decides on the maximum, in each case. The first among these is prearranged broadcasts. For example: (a) the user pays for all media and all players for infinite repeat viewing in advance; (b) the user pays for all media and all players but limiting either number of viewings and/or number of players; and (c) the user pays only for each viewing/listening. The second way to deliver media programs is that of selection (unicast) and downloading upon media player request (audio and/or video on demand) with the variations mentioned in the first case above. In the second case, the possibilities are: (a) an in-home or remote PC interacting with the STB 133 and or multimedia program provider's servers/sources 155, 157 and/or 159; (b) a remote control interaction with the STB 133 using the television screen for an audio player or for the television or for a portable television; or (c) the requesting media player interacting with the STB or multimedia program provider's servers/sources 155, 157 and/or 159 by way of user input via an user interface (screen and keypad, for example) connected to the media player.

In a home entertainment infrastructure 105, the STB 133 may receive any standard or proprietary formatted media program from the multimedia program provider's servers/sources 155, 157, and/or 159 without any encryption, and the STB 133 enforces media rights protection by encrypting the media program. For example, media may be delivered in an unencrypted format to the STB 133 for distribution while payment and viewing/listening tracking is performed by the STB 133 pursuant to interaction between the STB 133 and the remote billing server 159 (for billing and viewing/distribution control etc.). Alternatively, although encryption may be used to get the media program to the STB 133, encryption may not be used thereafter (i.e., the STB 133 never employs its encryption operations) even though rights management (media distribution, playback and billing control) still takes place. Finally, the multimedia program provider's servers/sources 155, 157, and/or 159 may employ full process.

For example, if the media rights requires encryption at least to the home, the STB 133 may choose to do end-to-end encryption and require the remote digital rights management server 155 to encrypt a highest resolution using the STB's 133 key. Then, the STB 133 may decrypt, transcribe to a media player's 111, 113, 115, 117, 119, 121, 123, 125, 127, 129 or 131 lower resolution, encrypt using the media player's 111, 113, 115, 117, 119, 121, 123, 125, 127, 129 or 131 key. Finally, the STB 133 transmits the media program to the media player 111, 113, 115, 117, 119, 121, 123, 125, 127, 129, or 131 for decryption and playback. The following paragraphs, with reference to the FIG. 1, describe some of these cases in detail.

When the multimedia program provider's servers/sources 155, 157, and/or 159 employ full process, the remote media source 157 serves encrypted media programs to the STB 133. The encrypted media program requires decryption information to process and present media programs via media players and/or sources 111, 113, 115, 117, 119, 121, 123, 125, 127, 129, 131 and 133. The decryption information is downloaded and used by the set top box circuitry 139, or the media players (and/or media sources) 111, 113, 115, 117, 119, 121, 123, 125, 127, 129 and 131 via STB 133, to deliver or to present in a format that can be reproduced on audio speakers or video displays. The remote billing server 159 or remote digital rights management server 155 provides decryption information upon user registry in the respective server database and purchase of an encrypted media program in stores or from the remote media source 157. By the process of encryption of the media program and decryption at the set top box circuitry 139 based upon decryption information, the user obtains limited number of licenses to reproduce; thus, the program provider's copyright privileges are enforced.

The multimedia program provider's server/source 155, 157, or 159 of the home entertainment infrastructure 105 serves transcoded and encrypted media programs requested by each individual of plurality of STB 133 devices registered with the servers. Further, the STB 133 devices with in a locality receive these transcoded, encrypted media programs, and deliver them to each individual of plurality of media devices 111, 113, 115, 117, 119, 121, 123, 125, 127, 129 and 131 registered with the STB, within a operational region via home entertainment system network 109. The STB 133 stores these received transcoded, encrypted media programs, in the media storage device 137, based upon a license agreement between the multimedia program provider's server/source 155, 157 or 159 and the user.

Figure 2:
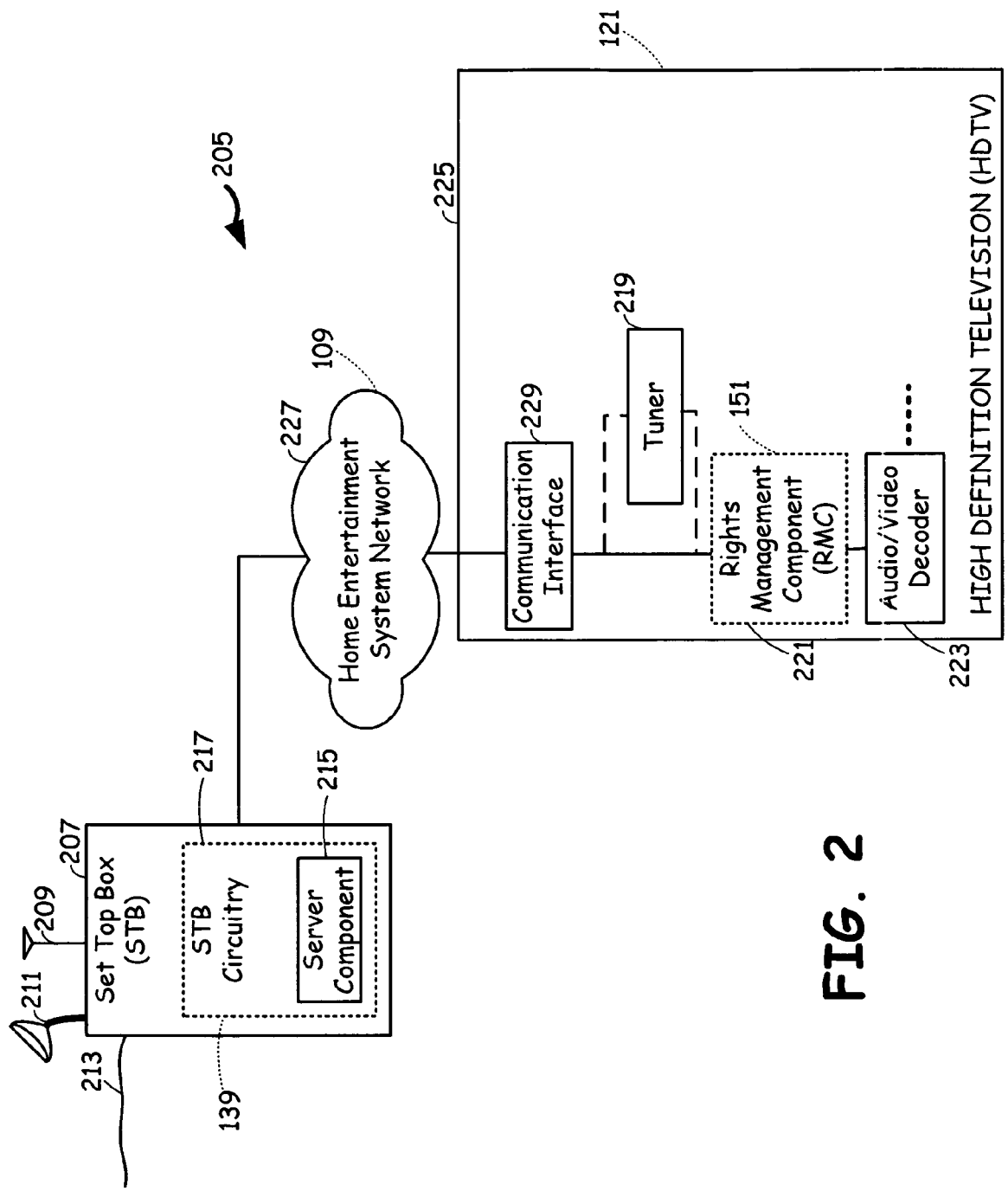
FIG. 2 illustrates an embodiment of a multi stage data rights management processing, in which a STB circuitry and a RMC functioning in a multi stages to accomplish the data rights management, in accordance with the present invention.

The user obtains the license agreement, by registering and/or logging in with the multimedia program provider's server/source 155, 157, or 159, using user input device 135 or a Personal Computer 119 communicatively coupled to the STB 133 via home entertainment system network 109. For the first time, the user registers the STB 133 with the multimedia program provider's server/source 155, 157, or 159 by providing user information and payment details. After initial registration, the user may download the transcoded, encrypted multimedia programs via STB 133, and store them in the media storage device 137, if the license permits. Encryption, decryption may use standards such as AES (Advanced Encryption Standard) to ensure payment, rights of the user (such as pay-per-view or limited number of uses) and rights of the multimedia program providers. Further, the data rights management is also enforced with pre-recorded media such as a DVD or VHS tape, in conjunction with a STB 133. Besides broadcast moving pictures, downloaded multimedia programs and pre-recorded media, the data rights management is applicable to audio programs as well as still visual images in formats such as JPEG. In the home entertainment infrastructure 105, the transcoding is performed in a single stage at the remote video source 157 or in multi stages located in one or more of the media devices 111, 113, 115, 117, 119, 121, 123, 125, 127, 129 and 131 and STB 133. FIG. 2 describes an example of a multi stage processing With respect to the transcoding and encryption-decryption, there are three operational scenarios, according to the present invention. All three operational scenarios involve the STB 133 (and the STB circuitry 139) as a hub to decrypt and distribute the transcoded, encrypted multimedia programs. The first operational scenario involves multimedia program provider's server/source 155, 157 or 159 and the media device 111, 113, 115, 117, 119, 121, 123, 125, 127, 129 or 131 interaction via STB 133, where as the STB 133 performs the duty of a mediator. The second operational scenario involves multimedia program provider's server/source 155, 157 or 159 and the media device 111, 113, 115, 117, 119, 121, 123, 125, 127, 129 or 131 interaction via STB 133, where as the STB 133 having rights to reissue licenses to media players 111, 113, 115, 117, 119, 121, 123, 125, 127, 129 or 131. The third operational scenario involves local media sources 111, 113, 115, 117, 119 and 121 incorporating the RMC 141, 143, 145, 147, 149 and 151 respectively and interacting with the STB 133 to decrypt and transcode the multimedia programs. In all three operational scenarios, the STB 133 and the RMC 141, 143, 145, 147, 149 or 151 have all or some of the STB circuitry 139 components such as network interface, rights management operations, decryption operations, transcoder, encryption operations, memory, and interfaces as described with reference to FIGS. 3, 4, 6, and 7. The server component 153, in all of the operational scenarios serve encrypted media programs to various media devices 111, 113, 115, 117, 119, 121, 123, 125, 127, 129 or 131 that are registered with the STB 133.

In the first operational scenario, according to the present invention, the STB circuitry 139 receives DRM (Data Rights Management) data protected media content from the multimedia program provider's server/source 155, 157, or 159. The DRM data protected media content may be broadcast television signals, multimedia audio and/or video programs such as movies or still video images. The STB circuitry 139 decrypts the DRM data protected media content, transcodes it as necessary to suit the format requirements of recipient media device 111, 113, 115, 117, 119, 121, 123, 125, 127, 129, or 131. Further, the STB circuitry 139 re-encrypts the transcoded media content to suit the recipient media device 111, 113, 115, 117, 119, 121, 123, 125, 127, 129, or 131 with in the operational range. Then, the STB circuitry 139 delivers the re-encrypted media content to the recipient media device 111, 113, 115, 117, 119, 121, 123, 125, 127, 129 or 131, if registered with the STB circuitry 139. However, in certain circumstances, the multimedia program provider's server/source 155, 157, or 159 may deliver unprotected media content to the STB circuitry 139, but require or allow the STB circuitry 139 to enforce the data rights management. The multimedia program provider's server/source 155, 157, or 159 may not deliver unprotected data to personal computer 119 or television 121 directly, because of difficulties with that data rights enforcement.

Alternatively, the STB circuitry 139 may directly deliver the DRM data protected media content without decryption, transcoding and re-encryption while keeping track of number of uses by the media device 111, 113, 115, 117, 119, 121, 123, 125, 127, 129 or 131 and limiting the usage of a media program. The STB circuitry 139 may collect usage information and/or delivery information and deliver it to the remote billing server 159, or shut down future usage of the media program. The media device 111, 113, 115, 117, 119, 121, 123, 125, 127, 129, or 131 that have previously received the media program may have to verify with the STB circuitry 139 to determine whether playback is still authorized. The STB circuitry 139 may in turn verify with the remote digital rights management server 155 and arrange for payment if further licensing is required.

For media rights protection, the media device 111, 113, 115, 117, 119, 121, 123, 125, 127, 129, or 131 contain a personal key known only to the corresponding media player. In addition, the media players 111, 113, 115, 117, 119, 121, 123, 125, 127, 129, and 131 contain a home key shared by all the media players and the STB circuitry 139 in the home entertainment system network 109. The home key is used to encrypt media programs and only the corresponding personal key may be used to decrypt them. In this case, all of the media players 111, 113, 115, 117, 119, 121, 123, 125, 127, 129 and 131 share a personal key that can unlock using a single home key. Alternatively, the STB circuitry 139 may contain a STB key, and the media players 111, 113, 115, 117, 119, 121, 123, 125, 127, 129 and 131 use personal keys to decrypt the STB circuitry 139 transcrypted (i.e., the STB circuitry 139 decrypts and re-encrypts the DRM data protected media programs) media programs. As a third alternative, the STB circuitry 139 may deliver the DRM data protected media programs without any intervention, and the media player 11, 113, 115, 117, 119, 121, 123, 125, 127, 129 or 131 use the personal key to decrypt the media programs. In this case, however, the STB circuitry 139 may still arrange for, track, and intercommunicate with the remote digital rights management server 155 for arranging the delivery, tracking and billing.

As an example of first operational scenario, the remote media source 157 may be a television broadcaster's server that serve live television broadcast or pre-programmed video program clippings. For the first time, the user registers with the remote billing server 159 by using user input device 135 and provides personal and payment related credentials as required by the television broadcaster. The user input device 135 may be a remote control with a display and a keyboard. After initial registration, the user may be able to log into the television broadcaster's server any time by providing user name and password and logging on to the server. In case of live television broadcast, the television broadcaster may enforce a monthly payment structure or based on the usage of the communication infrastructure where as with media program clippings, the television broadcaster may enforce pay-per-view basis. Once the user logs on to the television broadcaster's server and requests for a program of interest, the remote billing server 159 informs the television broadcaster's server (remote media source 157) to deliver the requested program. The STB circuitry 139 receives the DRM protected media content from the television broadcaster's server, and decrypts the DRM data protected media content, transcodes it as necessary to suit the format requirements of recipient media device such as a television 121. Further, the STB circuitry 139 re-encrypts the transcoded media content to suit the television 121 and delivers the re-encrypted media content to the television 121. The remote billing server 159 keeps track of usage of media program bills the user accordingly. The television broadcaster may not allow storing of the broadcast by the STB circuitry 139 in media storage device 137.

In the second operational scenario, the STB circuitry 139, after initial registration with the server, obtains license to receive and store DRM data protected media content from the multimedia program provider's server/source 155, 157 or 159 any time user wishes. Then, the STB circuitry 139 redistributes it within the operational range upon request and sends DRM data protected media content usage report back to the server. The STB circuitry 139 receives DRM data protected media content in any one standard transcoded and encrypted format and stores in the memory of the STB 133 or in media storage device 137. The user interacts with the with the multimedia program provider's server/source 155, 157 or 159 using the user input device and provides personal and payment related credentials as required. The STB circuitry 139, in the second operational scenario, has a modular functionality such as having a combination of hardware and software components. The license obtained by the STB circuitry 139 is stored in the memory of STB 133. The STB circuitry 139 is allowed by the multimedia program provider's server/source 155, 157, or 159 to decrypt, transcode, re-encrypt, and redistribute any number of times. The STB circuitry 139 enforces license agreements, provides usage information back to the server, and thus protects rights of the media program providers.

As an example of second operational scenario, the remote video source 157 may be an Internet based server that provides entertainment based media programs such as movies, music video, and other multimedia programs. After initial registration with the remote billing server 159 by using user input device 135, the user logs into the Internet based server any time by providing user name and password and logging on to the server. The user may use the user input device 135, which may be a remote control with a display and keyboard, or a computer connected to an Internet network. Here, the Internet based server provides a list of multimedia programs available with the service provider. The user may choose a list of programs to download and request the server to transfer those DRM data protected media programs to the video storage device 137. The STB circuitry 139 stores DRM data protected media programs downloaded from the remote media source 157 in the local memory. The DRM data protected media programs downloaded by the STB circuitry 139 also contain user details and license agreement for limited or unlimited number of uses or on a limited period of time basis. The STB circuitry 139, upon request by the local media devices such as a PDA 129, decrypts the stored programs and transcodes to match the audio and video requirements of the PDA 129, re-encrypts it, and delivers to the PDA 129. Each time the program is delivered to a media device such as PDA 129, the STB circuitry 139 keeps track of usage and sends this information back to the remote billing server 159. Further, when the license expires, the STB circuitry 139 does not allow the user to view the program anymore. Alternatively, if the user chooses to purchase DRM data protected media programs in the stores in the form of a DCD (Digital Compact Disk), VCD (Video Compact Disk), or VHS (Video Home System) tape, the STB circuitry 139 follows a similar process. That is, storing them in the local storage device 137, delivering transcoded, and re-encrypted programs to the media device 111, 113, 115, 117, 119, 121, 123, 125, 127, 129, or 131.

In accordance with the present invention, the third operational scenario involves media devices 111, 113, 115, 117, 119 and 121 incorporating all or portions of RMCs 141, 143, 145, 147, 149 and 151, and work in conjunction with STB circuitry 139 to enforce data rights management. The media devices 111, 113, 115, 117, 119, 121, 123, 125, 127, 129, and 131 are communicatively coupled to the STB 133 via home entertainment system network 109. The user purchases DRM data protected media programs via a removable storage unit such as DVD, VCD, or VHS tapes and uses them in a media player 111, 113, 115, 117, or 119. The media player RMC 141, 143, 145, 147, 149, and 151 works in conjunction with the STB circuitry 139 to decrypt, transcode and re-encrypt the DRM data protected media programs and present them using the video display. The user interacts with the media devices 111, 113, 115, 117, 119, 121, 123, 125, 127, 129 and 131 and/or the STB 133 using the user input device 135.

As an example, the user may purchase a DRM data protected DVD and load it on to a video player 115. The video player RMC 145 communicates with the STB circuitry 139, gets decryption information directly from the STB circuitry 139, and presents the audio and/or video in the corresponding display systems. The STB circuitry 139 in turn communicates with the remote digital rights management server 155 and downloads decryption information. Since the user has already paid for the media program and obtained licenses for limited use, there is no need of STB circuitry 139 interacting with the remote billing server 159. If the video player RMC 145 is not equipped with transcoding facility, the STB circuitry 139 may transcode and sends it back to the media player 115.

The billing of a DRM protected media program may occur on the basis of quality of audio and/or video such as lower bandwidth/transfer rate/MB means lower cost, or on the basis of a monthly fee. All media programs, whether in pre-recorded form (such as a DVD, VCD, VHS tapes), down loaded media content or live broadcast may be provided in an encrypted form with no ability for STB circuitry 139 to transcode it without a private key, in all of the above mentioned three operational scenarios. The DRM data protected media programs may be delivered adaptively or non-adaptively, considering screen and audio characteristics of the recipient media player 119, 121, 123, 125, 127, 129, or 131. The user input device 135 supports: (a) TV Guide for multicast TV broadcast programs or pre-recorded programs; (b) STB 133 registration with the multimedia server; (c) media device 111, 113, 115, 117, 119, 121, 123, 125, 127, 129 and 131 registration with the STB 133, with media player characteristics or make/model number (STB/server will subsequently obtain information based on a look-up table); (d) video search using various search engines (search parameters based on model/make number of the media players and/or user requests via STB 133); and (e) web crawler server that is independent of single source (many sites that carry videos are displayed at a single point-price comparison-select video, billing and delivery). For example of a web crawler server, a classical movie database may provide a single user interface, the user is provided with the facility to select and compare prices from variety of video sources and servers.

Licenses are provided by the multimedia program provider's server/source 155, 157 or 159 on a pay-per-view basis or for a number of plays (irrespective of the media player), extendable upon further payment and/or on a monthly subscription basis. For example, for obtaining or extending license, the STB 133 makes request to the server by providing public keys of all of the requesting media devices 111, 113, 115, 117, 119, 121, 123, 125, 127, 129, and 131 and the remote media source 157 delivers one of the pluralities of formats stored. Further, the remote media source 157 communicates transcoding parameters to the STB 133 together with the license. A clock is used in media devices/STB 111, 113, 115, 117, 119, 121, 123, 125, 127, 129, 131, and 133 that cannot be adjusted in conjunction with licensing, to enforce data rights management.

FIG. 2 illustrates an embodiment of a multi stage data rights management processing, in which a STB circuitry and a RMC functioning in a multi stages to accomplish the data rights management, in accordance with the present invention. The distributed RMC systems, which are interconnected via a home entertainment system network 227 (109 of FIG. 1), comprise of a STB 207 that incorporates a STB circuitry 217 and a HDTV (High Definition TeleVision) 225. The STB circuitry 217 further comprise of a server component 215.

The FIG. 2 is an example of STB circuitry 217 (139 of FIG. 1) and RMC 221 (151 of FIG. 1) functioning in a multi stage arrangement to accomplish the data rights management. The television 225 shown in FIG. 2 (121 of FIG. 1) may be any digital television such as a plasma television, LCD flat television, high definition television (HDTV) or any other prospective standard television. The exemplary television in FIG. 2 further shows some of the functional blocks of front end such as a communication interface 229, tuner 219, and A/V decoder 223, which are not a part of the RMC 221. The STB 207 receives DRM data protected media programs from remote media sources via any one or more of a WLAN, a LAN, a cable television network 213, a dish antenna 211, and another antenna 209. The STB 207 delivers STB circuitry 217 transcoded, re-encrypted media programs to the RMC 221. The STB 207 may be communicatively coupled to the RMC 221 either via a direct pathway or via a tuner 219.

Video input to the rights management component 217 is received from the STB 207, video player 115 (FIG. 1), PVR 117 (FIG. 1), computer 119 (FIG. 1) and other local and remote media sources 157 (FIG. 1). The remote media sources 157 include an Internet based vendor, a cable provider or a satellite based television signal provider. The input video signal to the STB circuitry 217 may be a downloaded MPEG (Moving Picture Experts Group) file, a HDTV broadcast signal, or any other proprietary digital broadcast signal. Some of the DRM data protected media content obtained from an Internet based vendor, a cable provider or a satellite based television signal provider may be stored in a memory unit (not shown) of the STB circuitry 217 or in the media storage device 137 (FIG. 1), as per license agreement with the remote media source 157. Then, the STB circuitry 217 obtains the media characteristics of the TV 225, such as screen refresh rate, by querying the rights management component 221 of HDTV 225 and delivers transcoded and re-encrypted media programs that match HDTV requirements.

Figure 3:
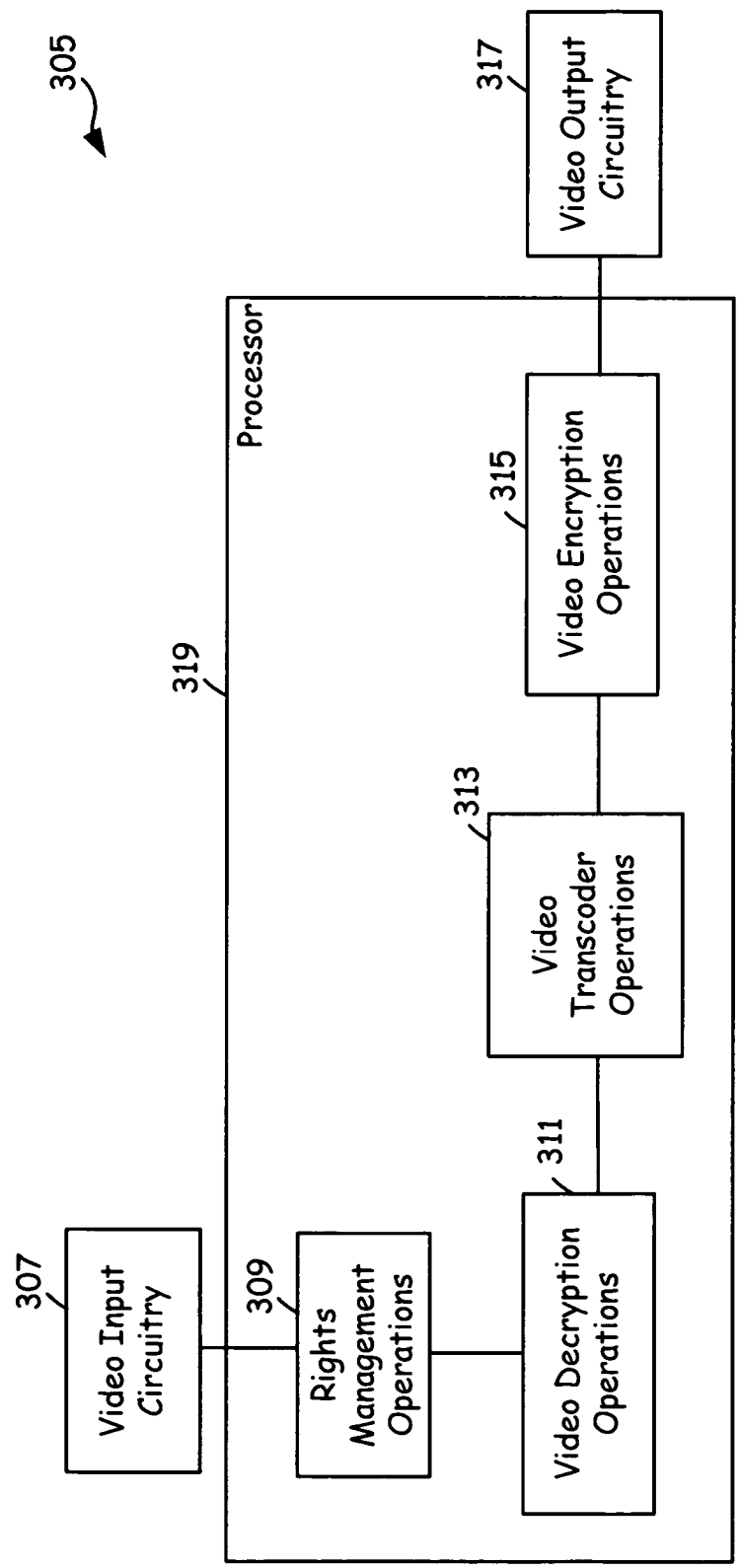
FIG. 3 is a block diagram illustrating the functional details of the video processing portion of a rights management component shown in FIG. 1.
Figure 4:
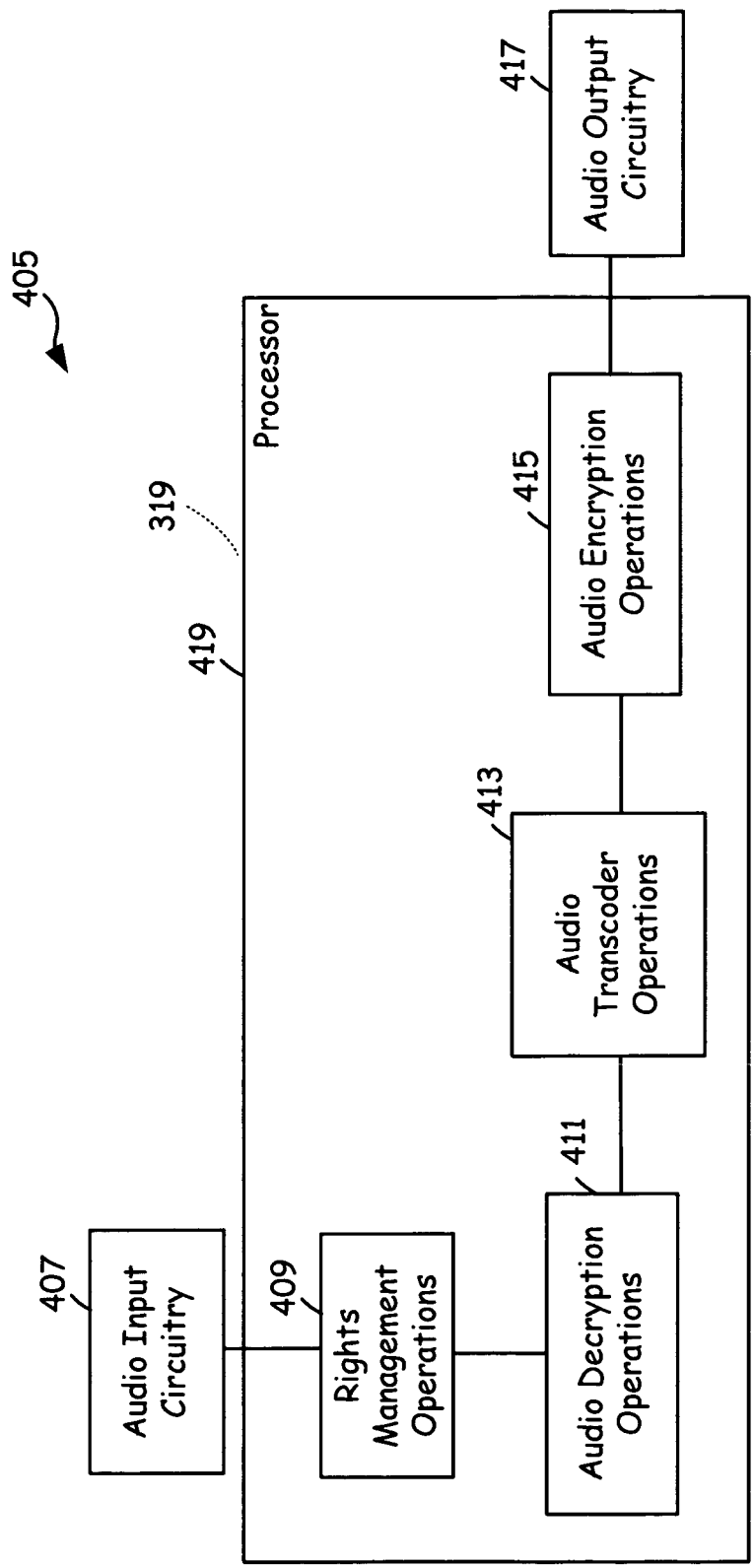
FIG. 4 is a block diagram illustrating the functional details of the audio processing portion of a rights management component shown in FIG. 1.

FIG. 3 is a block diagram illustrating the functional details of the video processing portion of a rights management component 305 shown in FIG. 1. The functional block diagram of FIG. 3 may represent video portion of any of the RMC components 141, 143, 145, 147, 149 and 151, while FIG. 6 specifically illustrates an embodiment of video portion of STB circuitry 139. The video portion of the RMC 305 (some or all of elements shown within each of the rights management components 139, 141, 143, 145, 147, 149, and 151 of FIG. 1) comprises of a video input circuitry 307, rights management operations 309, video decryption operations 311, video transcoder operations 313, video encryption operations 315 and video output circuitry 317. Although some of the following descriptions of FIGS. 3 and 4 are in terms of conceptual functional blocks, the operations of 309, 311, 313, 315, 409, 411, 413, and 415 may be handled by one or more digital signal processing units (processors 319 and/or 419).

The rights management component 305 is communicatively coupled to a distribution network home entertainment system network (109 of FIG. 1), via the video input circuitry 307. The home entertainment system network 109 delivers DRM data protected media programs from the STB 133 (of FIG. 1), or from a removable storage device via video input circuitry 307.

The rights management operations 309 assesses the received, from the video input circuitry 307, DRM data protected media program for its content and license agreement and determines on the requirements of decryption, transcoding and re-encryption, as described with reference to the FIG. 1. Further, the rights management operations 309 interact with the STB circuitry 139 (of FIG. 1) and obtains decryption information. Then, the rights management operations 309 instructs the video decryption operations 311 to decrypt the DRM data protected media program according to the decryption information.

The video transcoder operations 313 obtains information regarding the media player for transcoding, such as screen size, refresh rate required, frame rate, audio format information, user preferences (region of interest adaptation, resizing of the windows, or desired quality of display, for example) and transcodes the decrypted input video signals. If the information regarding screen size, refresh rate required, frame rate and audio format information are not available with the device, the video transcoding operations 313 verifies with a look-up table in a database, and based upon the information of manufacturer and device model number and extracts this information. However, when the RMC 305 is integrated into a media device, the transcoding requirements are programmed in video transcoder operations 313.

Then, the video encryption operations 315 re-encrypt the transcoded video signal and sends it to the video output circuitry 317. The video output circuitry 317 delivers thus processed video signal to the media device in consideration.

For example, the RMC 305 may be video portion of the RMC 151 of HDTV 121 (in FIG. 1), which is interacting with the STB circuitry 139 (of FIG. 1) to enforce data rights of the media program providers. The decryption, transcoding, and re-encryption may occur in the television itself, as described above, or may occur in conjunction with the STB circuitry 139.

FIG. 4 is a block diagram illustrating the functional details of the audio processing portion of a rights management component 405 shown in FIG. 1. The functional block diagram of FIG. 4 represents audio portion of any of the RMC components 141, 143, 145, 147, 149 and 151, while FIG. 7 specifically illustrates an embodiment of audio portion of STB circuitry 139. The audio portion of the RMC 405 comprises audio input circuitry 407, rights management operations 409, audio decryption operations 411, audio transcoder operations 413, audio encryption operations 415, and audio output circuitry 417.

The audio input circuitry 407 receives DRM data protected audio signal from the STB 133. The rights management operations 409 processes license agreement regarding audio signals and determines on the requirements of decryption, transcoding and re-encryption. Further, based upon the decryption information, the rights management operations 409 instructs the audio decryption operations 411 to decrypt the DRM data protected audio signals.

The audio transcoding operations 413 gathers relevant information regarding the media player for transcoding, such as mono, stereo or surround sound signal format and transcodes the decrypted audio signals. Then, the audio encryption operations 415 re-encrypts the transcoded audio signal and sends it to the audio output circuitry 417. The video output circuitry 417 delivers thus processed audio signal to the media player in consideration.

Figure 5:
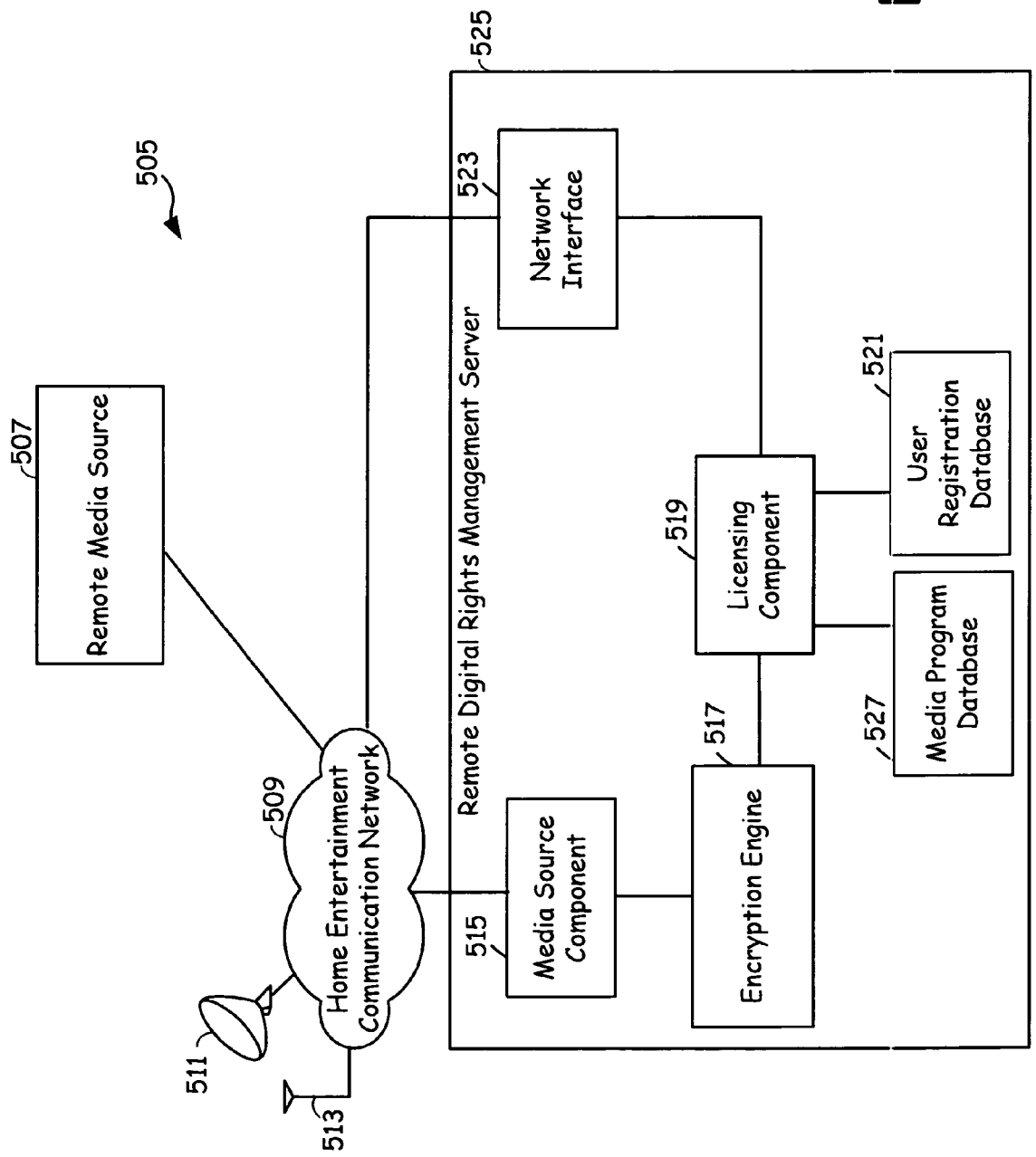
FIG. 5 is a functional block diagram illustrating the functional details of a remote digital rights management server shown in FIG. 1, according to the present invention.

FIG. 5 is a functional block 505 diagram illustrating the functional details of a remote digital rights management server shown in FIG. 1, according to the present invention. The remote digital rights management server 525 comprises of a media source component 515, encryption engine 517, licensing component 519, user registration database 521, media program database 527 and network interface 523. The remote digital rights management server 525 is communicatively coupled to a home entertainment communication network 509 via a dish antenna 511, any other antenna 513 or via a wired connection. The remote digital rights management server 525 communicates with a remote media source 507, which is also communicatively coupled to the home entertainment communication network 509.

In accordance with the present invention, the remote digital rights management server 525 maintains a media program database 527, which is a database of all the programs distributed to the users via marketing and sales either in the form of removable storage units such as DVD or VCD or via the home entertainment communication network such as an Internet. The remote digital rights management server 525 further maintains a user registration database 521, which is a database containing information regarding user registration and user payment credentials.

When a user acquires a DRM data protected media program in the form of a DVD or via downloading, and plays it using a media player, the media player sends a request for decryption information to the STB circuitry (139 in FIG. 1). The STB circuitry 139 in turn sends a request for the decryption information to the remote digital rights management server 525, via home entertainment communication network 509, by providing user information such as username and password. The media source component 515 receives a request, processes it, and allows the licensing component 519 to verify user information with the user registration database 521. Once the user registration verification is completed, the licensing component 519 extracts the decryption information from the media program database 527 and sends it back to the STB circuitry 139.

In certain embodiments, the remote media source 507 may be combined with the remote digital rights management server 525. In these cases, the media source component 515 in conjunction with the encryption engine 517 and licensing component 519, processes the requests of the media device, extracts the requested media program from the media program database 517 and sends it to the recipient media player or STB 133 (in FIG. 1). The network interface 523 interfaces between the remote digital rights management server 525 and the home entertainment communication network 509.

Figure 6:
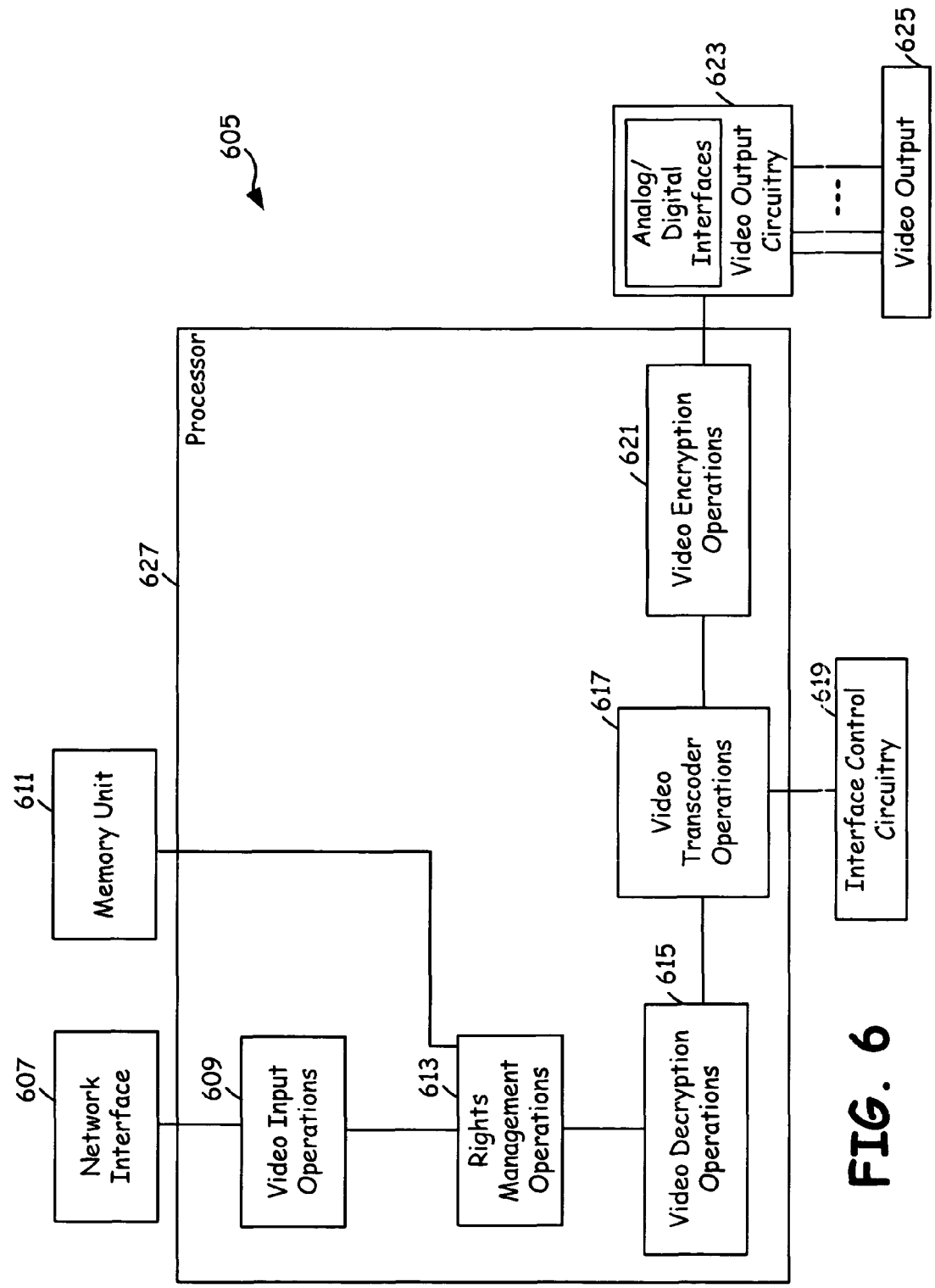
FIG. 6 is a block diagram illustrating the circuitry involved in the video processing portion of a set top box circuitry (STB circuitry)
Figure 7:
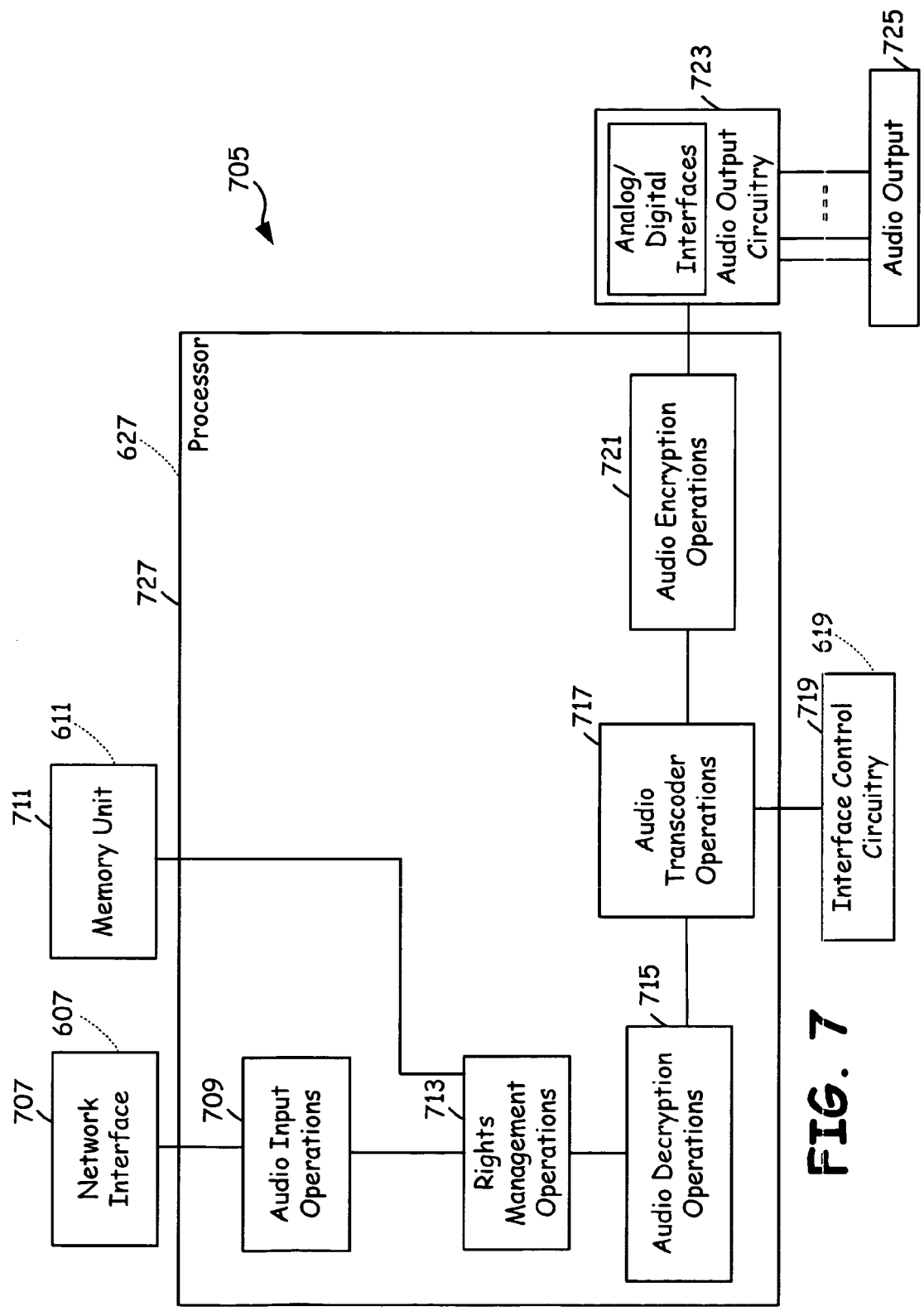
FIG. 7 is a block diagram illustrating the circuitry involved in the audio processing portion of a set top box circuitry (STB circuitry)

FIG. 6 is a block diagram 605 illustrating the circuitry involved in the video processing portion of a set top box circuitry (STB circuitry). The STB circuitry 139 (FIG. 1) video processing portion 605 of the STB 133 (FIG. 1) comprises of a Network interface 607, video input operations 609, memory unit 611, rights management operations 613, video decryption operations 615, video transcoder operations 617, video encryption operations 621, interface control circuitry 619, video output circuitry 623 and video output 625. The video output circuitry 623 further comprises of a plurality of interfaces such as digital wired interface, analog-wired interface, digital wireless interface, and analog wireless interface for delivering re-encrypted media programs to a plurality of media players within the operational region, via either a LAN (Local Area Network) or WLAN (Wireless Local Area Network). Although some of the following descriptions of FIGS. 6 and 7 are in terms of conceptual functional blocks, the operations of 609, 613, 615, 617, 621, 709, 713, 715, 717, and 721 may be handled by one or more digital signal processing units (processors 627 and/or 727).

The set top box 133 (FIG. 1) receives programs from the multimedia program provider's server/source 155, 157 or 159 (FIG. 1). The network interface 607 provides various interfaces to communicatively couple with the multimedia program provider's server/source 155, 157 or 159 (FIG. 1). The video input operations 609 facilitates in receiving these DRM data protected multimedia programs.

The rights management operations 613 verifies license agreement coded in the DRM data protected media programs and accordingly, and if programmed by the user, stores them in the memory unit 611. If the received media programs are of analog format, the A/D (Analog to Digital) converter built into the video input operations 609 converts to a digital format. The memory unit 611 may be an external media storage device 137 (FIG. 1) or internal memory of the STB 133 (FIG. 1) or both. The rights management operations 613 further facilitates in determining the multimedia program provider's rights and/or user rights of the received media programs and directs the user to take action regarding registration and making payments, if the DRM data protected media programs downloaded are on a pay-per-view basis. The rights management operations 613 also interacts with the multimedia program provider's server/source 155, 157 or 159 (FIG. 1) to obtain decryption information.

Based upon the decryption information, the DRM data protected media programs thus received are decrypted by the video decryption operations 615. The set top box 133 receives requests for media programs from a plurality of media devices such as a television 121, computer 119, video player 115, personal video recorder 117, audio player 113 and PDA 129 (as described with reference to the FIG. 1). The decrypted video signals are transcoded based upon the video characteristics of the requesting media device, by the video transcoding operations 617. Then, the video encryption operations 621 re-encrypts the transcoded media program to match the requirements of the requesting media device.

The interface control circuitry 619 is a user interface that allows the user to direct the STB circuitry 605 to store media programs, transcode and deliver media programs to the requesting media player, via appropriate interfaces embedded in the video output circuitry 623. The video output circuitry 623 segregates output of the video encryption operations 621 into a plurality of video signals, based upon the control signals from the interface control circuitry 619. Further, the video output circuitry 623 transmits them wirelessly in the operational region or sends them via wires, based upon the user input from the interface control circuitry 619. The video output circuitry 623 converts digital video signals to analog format when an analog output is required based upon control input from the interface control circuitry 619. The digital wired interface and the digital wireless interface allow the segregated digital video output transmitted via wires or wirelessly. Similarly, the analog wired interface and the analog wireless interface allow analog video output to be channeled to the recipient analog video systems, via wires or wirelessly. All channels of the video output, both analog and digital; are made available at the video output 625 via composite jacks.

FIG. 7 is a block diagram 705 illustrating the circuitry involved in the audio processing portion of a set top box circuitry (STB circuitry). The video processing portion shown in FIG. 6 together with the audio processing portion shown in FIG. 7 form the STB circuitry 139 of the STB 133 (of FIG. 1), according to the present invention. The audio processing portion 705 of the STB circuitry 1139 (FIG. 1) comprises of an audio input operations 709, audio decryption operations 715, audio transcoder operations 717, audio encryption operations 721, audio output circuitry 723 and audio output 725. The audio output circuitry 723 further comprises of digital wired interface, analog wired interface, digital wireless interface and analog wireless interface for delivering re-encrypted media programs to media players within the operational region, via either a LAN (Local Area Network) or WLAN (Wireless Local Area Network). The interfaces of the audio output circuitry 723 work in conjunction with the corresponding interfaces of the video output circuitry 623 shown in FIG. 6. The network interface 707, memory unit 711 and interface control circuitry 719 are respectively same as blocks 607, 611 and 619 in the video portion of the STB circuitry 139 (FIG. 1), and they perform same functions.

The audio input operations 709 receives audio portion of the DRM protected media programs from the multimedia program provider's server/source 155, 157 or 159 (FIG. 1). If the received audio input is of analog form, the analog to digital (A/D) converter (not shown) converts audio signals to a digital form. The received DRM data protected media programs may be stored in the memory unit 711, according to the user preferences via interface control circuitry 719. The memory unit 711 may be an external media storage device 137 (FIG. 1) or internal memory of the STB 133 (FIG. 1) or both.

The rights management operations 713 verifies license agreement for audio signals coded in the DRM data protected media content and accordingly, and if programmed by the user, stores them in the memory unit 711. The rights management operations 713 further facilitates in determining the multimedia program provider's rights and/or user rights of the received media programs and directs the user to take action regarding registration and making payments, if the DRM data protected audio programs downloaded are on a pay-per-view basis. The rights management operations 713 also interacts with the multimedia program provider's server/source 155, 157 or 159 (FIG. 1) to obtain decryption information for the audio content.

Based upon the decryption information, the DRM data protected audio programs are decrypted by the audio decryption operations 715. The decrypted audio signals are transcoded based upon the audio characteristics of the requesting media device, by the audio transcoding operations 717. Then, the audio encryption operations 721 re-encrypts the transcoded media program to match the requirements of the requesting media device.

The interface control circuitry 719 directs, according to the user programs, to store DRM data protected audio content in memory 711, to transcode decrypted audio content to one of mono, stereo, or surround sound audio signals by the audio transcoder operations 717, and to deliver using appropriate interfaces in the audio output circuitry 723. The audio output circuitry 723 segregates the audio portions into plurality of audio output signals each complying with the programs in the interface control circuitry 719 and delivers them to a plurality of requesting media players via audio output 725.

Figure 8:
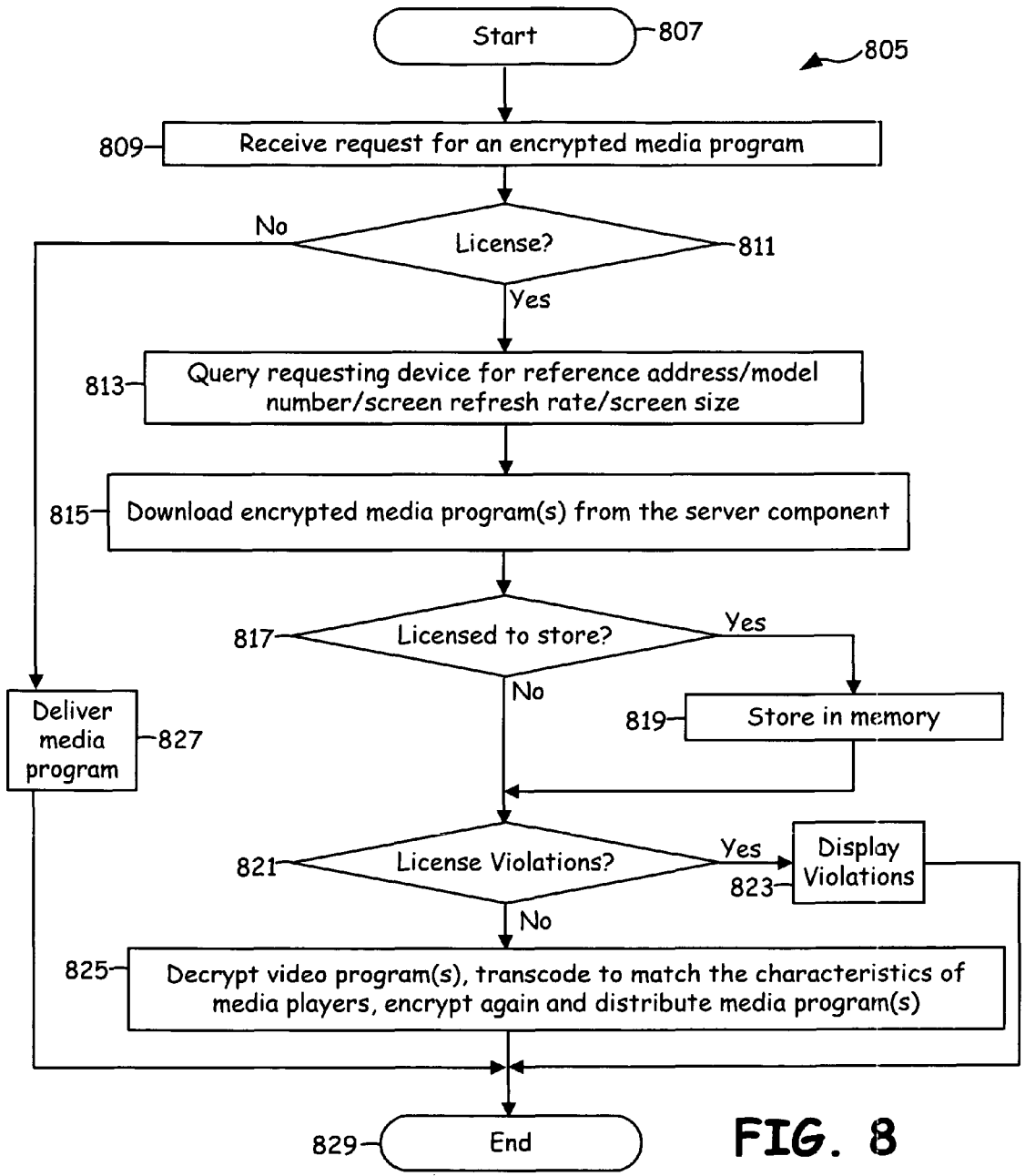
FIG. 8 is a flow diagram 805 illustrating a method performed by the set top box circuitry (STB circuitry), performing the function of a mediator by receiving encrypted media programs from remote servers, decrypt, decode and re-encrypt and deliver re-encrypted media programs to the media devices.

FIG. 8 is a flow diagram 805 illustrating a method performed by the set top box circuitry (STB circuitry), performing the function of a mediator by receiving encrypted media programs from remote servers, decrypt, decode and re-encrypt and deliver re-encrypted media programs to the media devices. The method of STB circuitry performing the function of a mediator shown in FIG. 8 is the method according to the first operational scenario described with reference to the FIG. 1, and starts at a block 807. At a next block 809, the STB circuitry receives request for a re-encrypted media program.

Then at a next decision block 811, the STB circuitry determines whether there is a requirement of license for downloading the program. For this, the STB circuitry interacts with multimedia program provider's server. If there are no license requirements at the block 811, then the STB circuitry downloads the requested media program, transcodes it and delivers it to the requesting media device at a next block 827. The process ends at block 829, since the data downloaded is not data protected and there are no requirements of enforcing data rights of the multimedia program providers.

If at the decision block 811, the license agreement is required, for the first time registration of the user is done (not shown). Further, the requesting media devices are also registered with the STB circuitry (not shown). Then, the STB circuitry at a next block 813 queries the requesting media device for device related information such as reference address, model number, screen refresh rate and/or screen size. This information is communicated to the multimedia program provider's servers. Further, this information is required for transcoding the media programs.

Then, at a next block 815, DRM data protected (encrypted) media program is downloaded from the multi media program provider's server. Then at a next decision block 817, the license agreement is decoded to check if the downloaded media program is allowed to store. If yes, at a next block 819, the DRM data protected media program is stored.

At a next decision block 821, the STB circuitry decodes and verifies license agreement to check if there are any agreement violations such as payment not made. This step may not be necessary if the verification is done upstream at the multimedia program provider's server end. If any violations are found, at a next block 823, the violation(s) are displayed and the user is requested to take appropriate actions and the method ends at the block 829.

Then, the DRM data protected media program is decrypted, transcoded based upon requesting media device characteristics and the media program is re-encrypted to suit characteristics of the requesting media device, at a next block 825. Then, the re-encrypted program is delivered to the requesting media player. The STB circuitry in conjunction with RMCs at the media devices may not allow storing of the media program at the media devices, if license agreement does not permit. The method ends at the end block 829.

Figure 9:
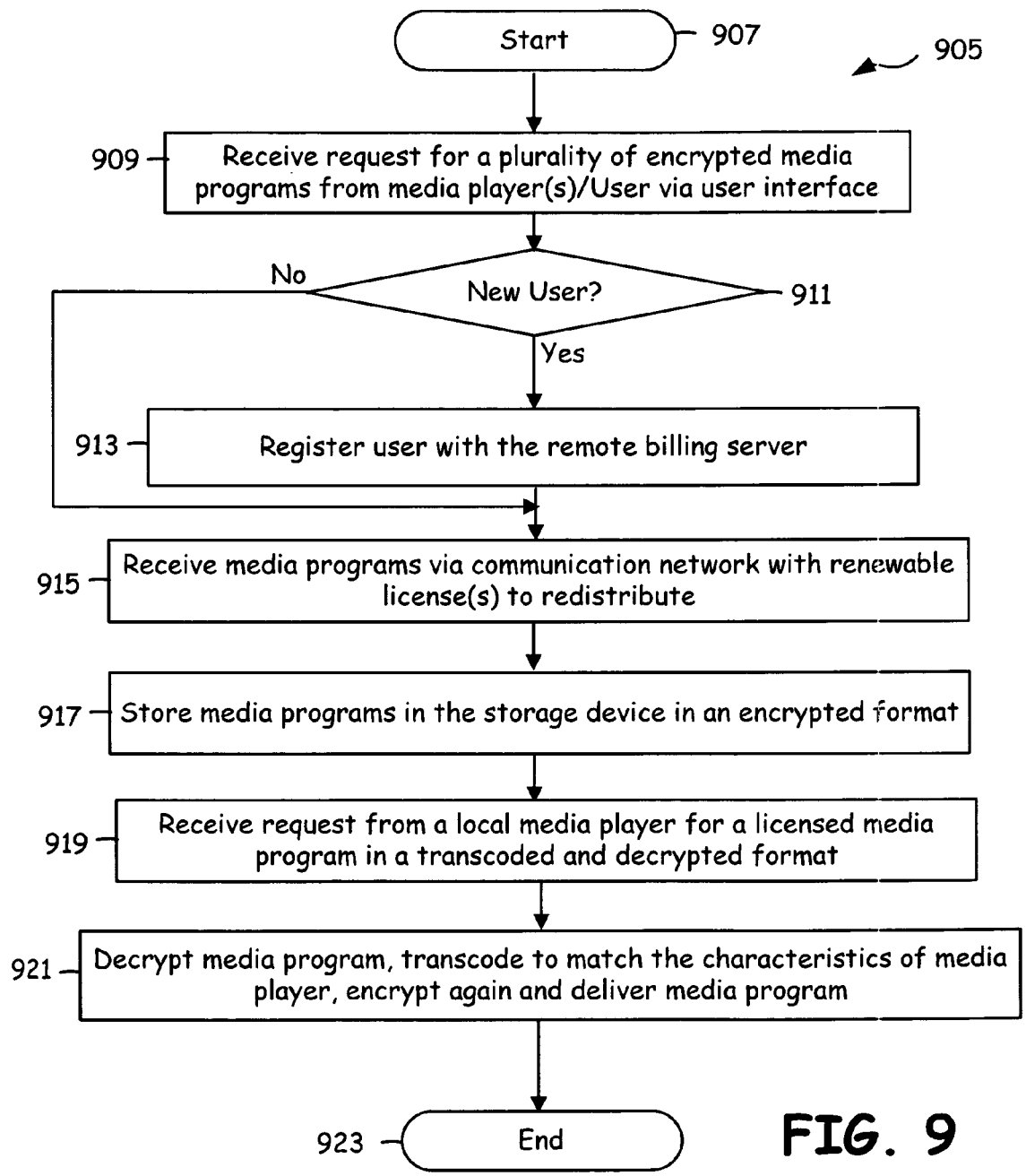
FIG. 9 is a flow diagram illustrating a method performed by the set top box circuitry (STB circuitry), performing a license granting function by receiving encrypted media programs from remote servers, storing them in storage devices and re-distributing them to the media devices based upon the media device characteristics.

FIG. 9 is a flow diagram 905 illustrating a method performed by the set top box circuitry (STB circuitry), performing a license granting function by receiving encrypted media programs from remote servers, storing them in storage devices and re-distributing them to the media devices based upon the media device characteristics. The method of STB circuitry performing the function of license granting shown in FIG. 9 is the method according to the second operational scenario described with reference to the FIG. 1, and starts at a block 907. At a next block 909, the STB circuitry receives request for a plurality of re-encrypted media programs from media devices and/or the user.

Then at a next decision block 911, the STB circuitry verifies if any new users or devices are registered. If new users or devices are registered, then at a next block 913, the user or devices are registered with the remote billing server. At a next block 915, the STB circuitry downloads media programs from the remote video source. At a next block 917, the downloaded media programs are stored, either in the memory of the STB itself or in an external media storage device.

Whenever a request comes from a media device registered with the STB circuitry, at a next block 919, for a licensed media program in a decrypted, transcoded and re-encrypted format the STB circuitry processes the request. At a next block 921, the STB circuitry decrypts the downloaded and stored media program, transcodes to match requesting media device, and re-encrypts and delivers them. The program usage by the users and the devices are monitored by the STB circuitry and this information is sent back to periodically to the remote billing server (not shown). The method ends at block 923.

Figure 10:
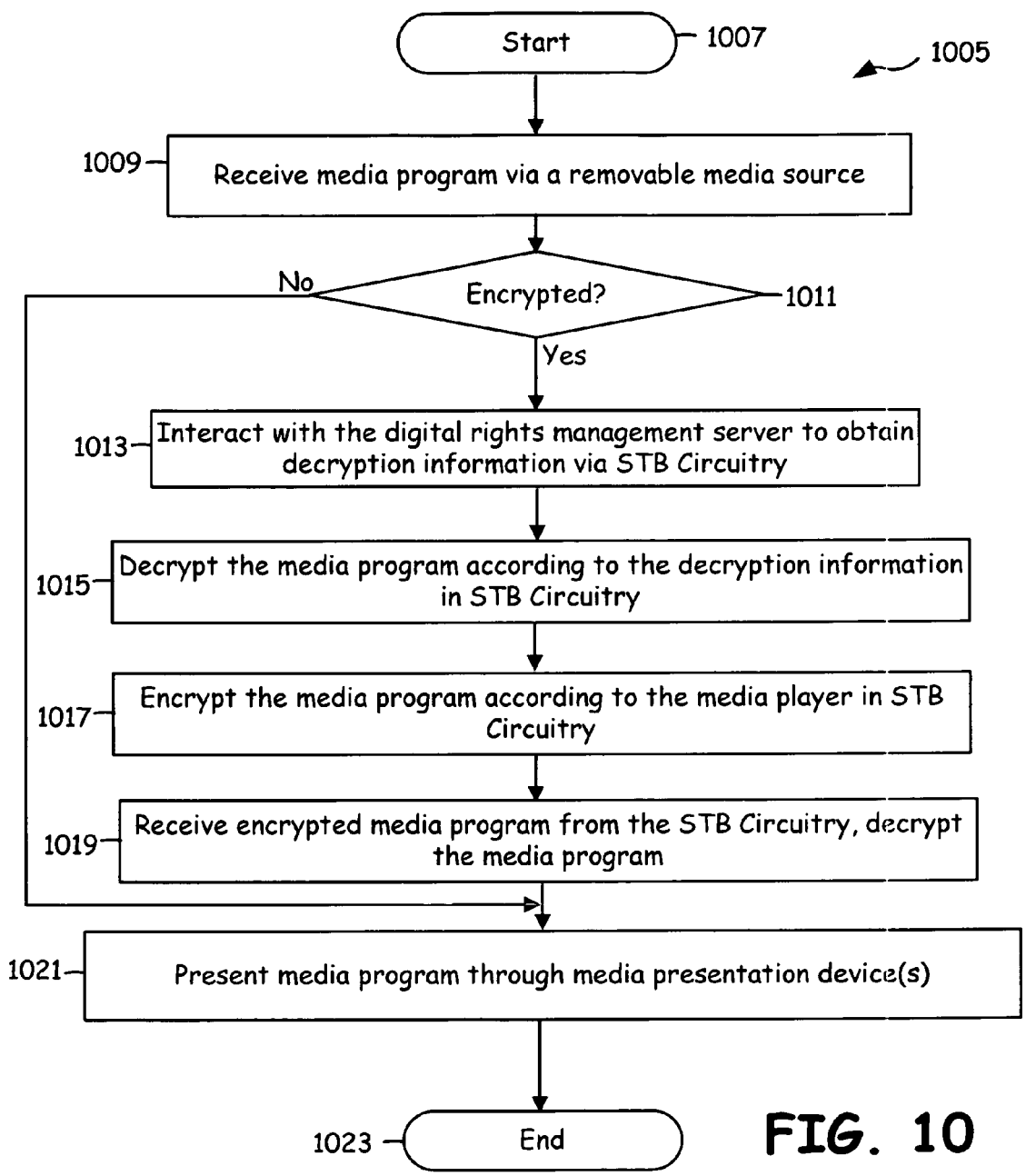
FIG. 10 is a flow diagram illustrating a method performed by the media devices while interacting with the remote servers, via set top box circuitry (STB circuitry), by receiving encrypted media programs from removable storage sources, obtaining decryption information from remote servers and presenting the decrypted media programs via displays.

FIG. 10 is a flow diagram 1005 illustrating a method performed by the media devices while interacting with the remote servers, via set top box circuitry (STB circuitry), by receiving encrypted media programs from removable storage sources, obtaining decryption information from remote servers, and presenting the decrypted media programs via displays. The method of media devices interacting with the STB circuitry to enforce data rights of the multimedia providers shown in FIG. 10 is the method according to the third operational scenario described with reference to the FIG. 1, and starts at a block 1007. At a next block 1009, the media device receives media programs in the form of a removable storage device such as a DVD or VCD.

At a next decision block 1011, the RMC of the media device in consideration verifies if the media program thus received is DRM data protected. If the media program is not DRM data protected, then at a next block 1021, the media program is presented via displays and speakers without involving STB circuitry and the process ends at block 1023.

If on the other hand, at the decision block 1011, it is verified that the media program is DRM data protected, then at block 1013 the RMC of the media device interacts with the STB circuitry server with which it is registered, and obtains decryption information. For this, STB circuitry server communicates with the remote billing server. At a next block 1015, the RMC of the media device decrypts the media program at the STB circuitry. At a next block 1017, the STB circuitry re-encrypts the media program. The STB circuitry transcodes decrypted program if necessary before re-encrypting (not shown in FIG. 10).

Then, at a next block 1019, the RMC receives the re-encrypted media program. The media device, presents the media program by decrypting and presenting through displays and speakers, at the next block 1021. The method ends at the end block 1023.

Figure 11:
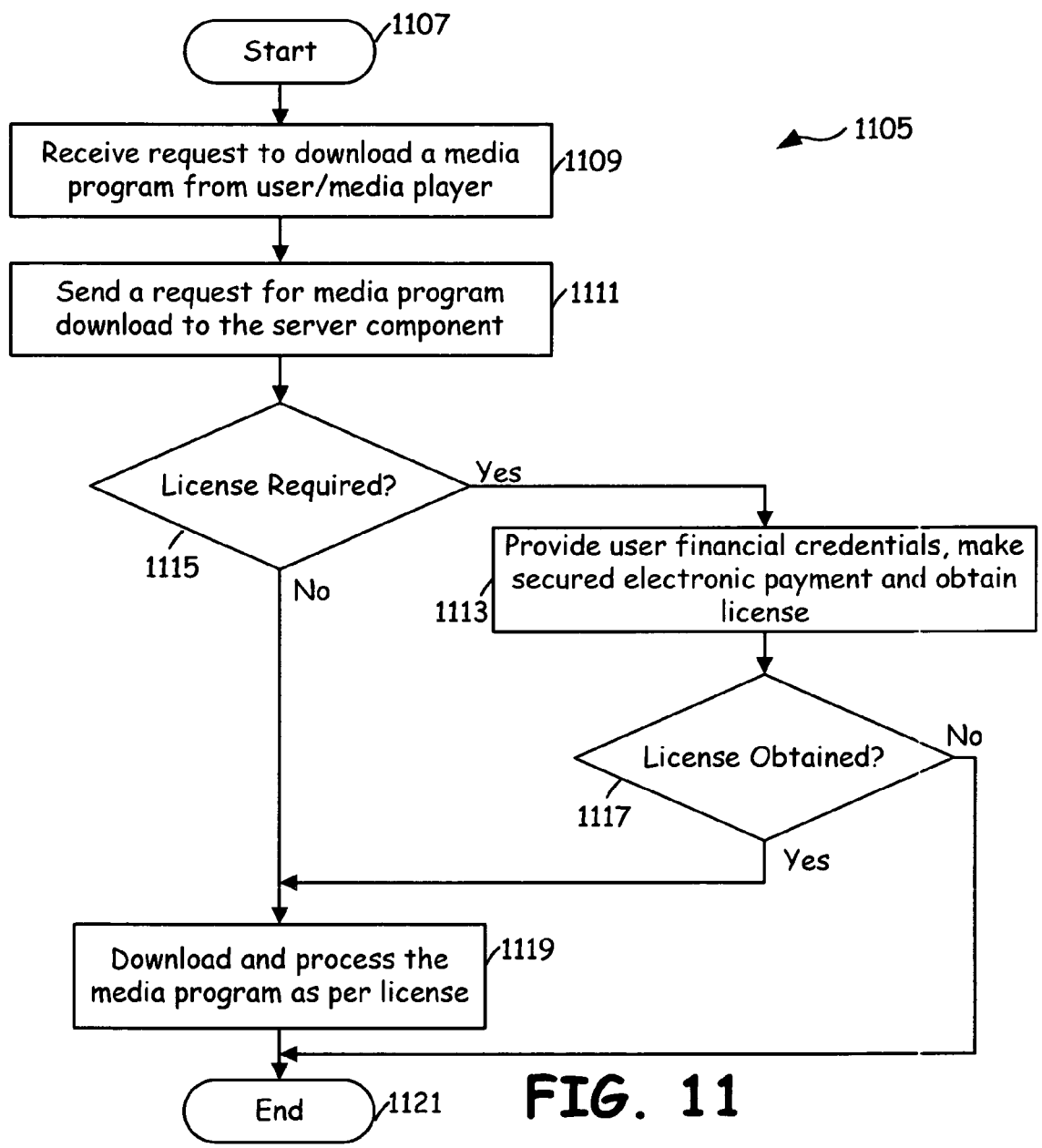
FIG. 11 is a flow diagram illustrating the method used by the set top box rights circuitry (STB circuitry), for registering with the remote server and obtaining licenses to receive media program on a pay-per-view basis.

FIG. 11 is a flow diagram 1105 illustrating the method used by the set top box circuitry (STB circuitry), for registering with the remote server and obtaining licenses to receive media program on a pay-per-view basis. The flow chart 1105 exemplifies the process of receiving a pre-recorded or live media program from the Internet on a pay-per-view basis.

The processes of obtaining a DRM data protected media program starts at block 1107. Then, at a next block 1109, the user or a media device requests STB circuitry for a media program. For this, the user logs on to a website of choice in the Internet using a user input device and selects the desired programs from a list provided by the media program provider. Then, the user requests to download selected programs to the server component, at a next block 1111, by clicking with the mouse on the respective buttons.

Then, at a next decision block 1115, the STB circuitry decides whether there is a requirement of license for the programs selected. If yes, at a next block 1113, the user provides financial credentials and makes secured payment and obtains license using the user input device. If, at the block 911, there is no need for permission to download media program, the process jumps to a next block 1119.

Then, at a next decision block 1117, a decision is taken regarding whether the user has obtained license. If the user has not given all the necessary information for billing or does not make payment, the process of downloading ends at a block 1121.

If at the decision block 1117, the user provides all the necessary information and makes payment, the user is allowed to download the media program at a next block 1119. Then, the process of downloading ends at the block 1121.

Figure 12:
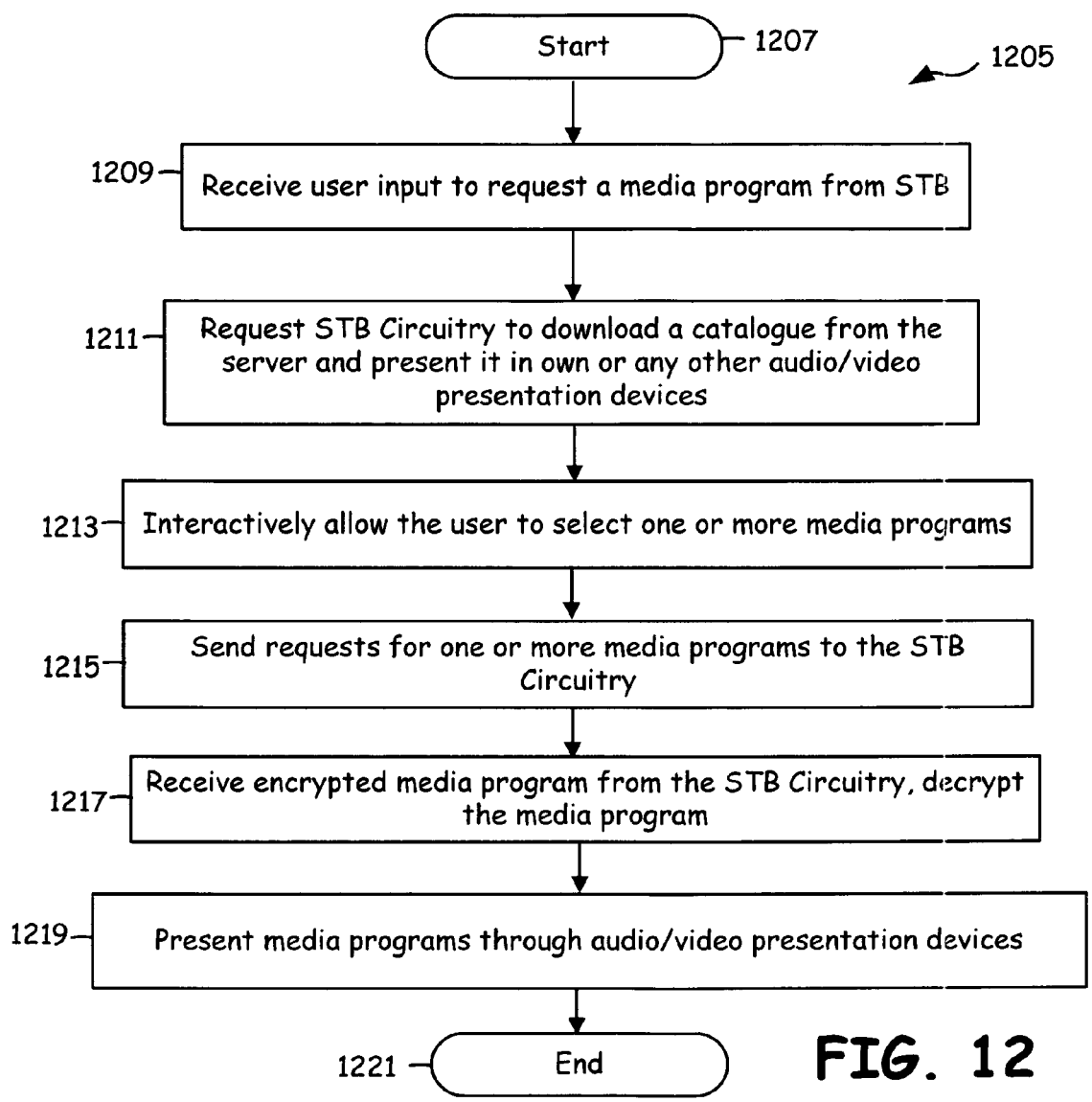
FIG. 12 is a flow diagram illustrating a method performed by a media device while interacting with the STB, to make requests using their own or the television screen and audio system.

FIG. 12 is a flow diagram 1205 illustrating a method performed by a media device while interacting with the STB, to make requests using their own or the television screen and audio system, according to the present invention. The method of media devices interacting with the STB starts at block 1207. At a next block 1209, the media device receives user input requesting for a catalogue containing one or more media programs. The media device may receive the user input directly through one of its user interfaces. The media device may immediately initiate interaction with the STB to obtain media program from one of the remote media sources or from its own memory, or may initiate interaction at a later preprogrammed time.

At a next block 1211, the media device initiates interaction with the STB and sends request to the STB circuitry to download a catalogue from the remote media provider's server. The media device presents the received catalogue to the user upon request using one of its own audio and/or video user interfaces or through any other audio/video presentation tools connected to it. For example, the media device may be a home theatre system, television, and/or DVD player, all of which are interconnected via a home entertainment system network. The media device may have a user interface containing a keyboard containing appropriate keys and a display to scroll through a list provided and makes selections. Alternatively, the media device may utilize the television screen to display the catalogue and utilize a remote control with appropriate scrolling keys to allow user to select a list of media programs.

Then, the user is allowed to select one or more media programs, at a next block 1213. The selected media program list is sent back to the STB circuitry, at a next block 1215. The STB, at this stage, searches through its memory and retrieves programs available. In addition, the STB sends request to the media provider's server for programs that are not available in its memory and receives them after arranging for billing and payment. Finally, the STB sends all of the requested media programs to the media device.

At a next block 1217, the media device receives all of the requested media programs. Then, the media device presents the media programs through audio/video presentation devices according to the user needs, at the next block 1219. In this entire process of media device interaction with the STB and indirectly with the remote media sources, the data rights management may be done in one of the many different ways described with reference to the FIG. 1. The method ends at a block 1221.

Figure 13:
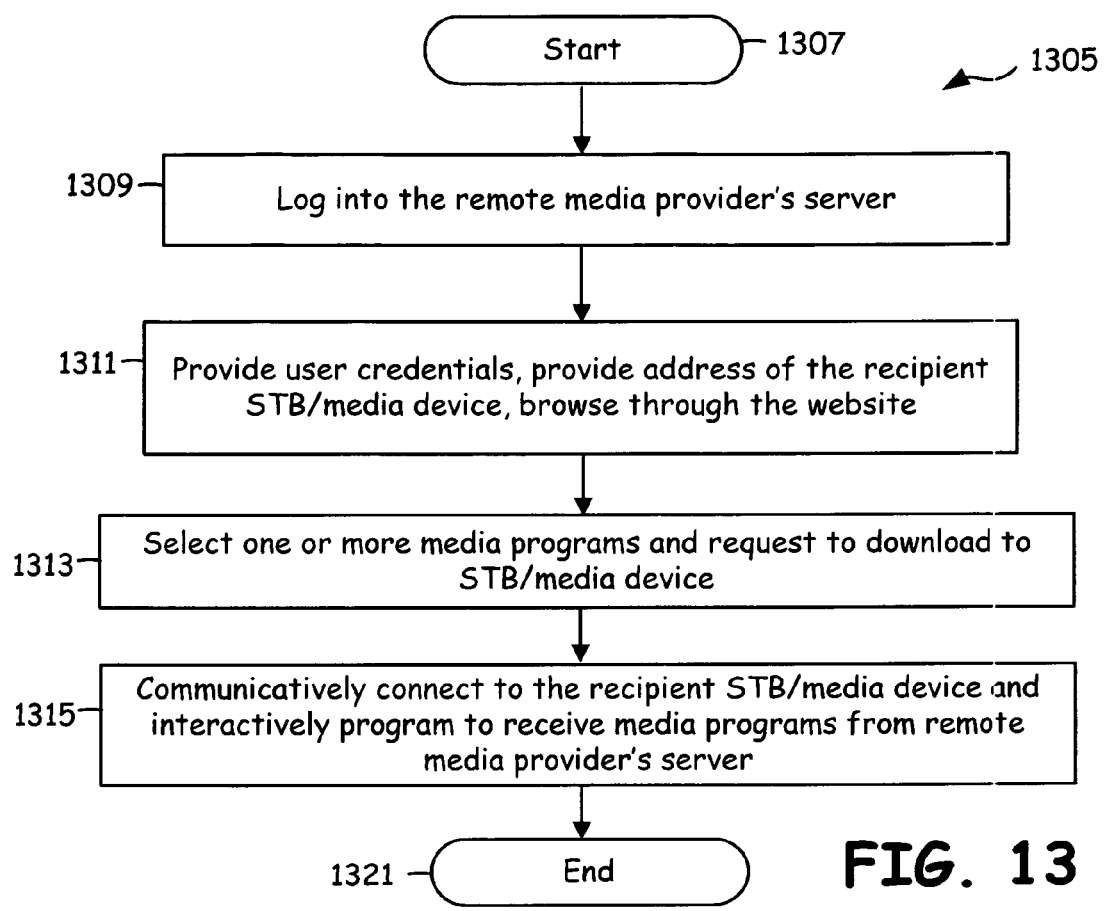
FIG. 13 is a flow diagram illustrating a method performed by the personal computer, while interacting with the STB, media provider's server and/or remote digital rights management server and arranges to deliver media programs to the STB or media devices.

FIG. 13 is a flow diagram 1307 illustrating a method performed by the personal computer, while interacting with the STB, media provider's server and/or remote digital rights management server and arranges to deliver media programs to the STB or media devices. In this scenario, the user, rather than using the media device or STB user interfaces, uses a personal computer to log into the user account of the media provider's server and requests for media programs. Since the personal computers with internet connectivity is available everywhere, the user is able to download media programs into the STB or media devices registered with the media provider's server at user's own convenience. The process starts at block 1307.

Then, at a next block 1309, the user logs into the media provider's server by providing username and password. The billing arrangements for downloading media programs may be done by one of the several methods explained with reference to the FIGS. 1 and 11. Then, at a next block 1311, the user provides the necessary user credentials and provides the IP addresses of the recipient STB or media device if not already done so while registering with the media provider's server. Then the user browses through the media provider's website, which contains a large database of media programs.

At a next block 1313, the user selects one or more media programs and clicks on appropriate buttons to download media programs into the STB or media device. At a next block 1315, the user remotely connects to the STB or media device, via the personal computer, home entertainment communication network and/or home entertainment system network, and programs the STB or media device to receive the media programs. The user may also be able to rearranging the memory contents of the STB or media device, such as deleting or renaming the contents of the memory. Finally, the process ends at a block 1321.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A set top box that interacts with at least one server to manage media consumption within a home entertainment network, the set top box comprising:
   a first interface coupled to the Internet to communicate with the at least one server;
   a second interface coupled to the home entertainment network to communicate with a plurality of media players; and
   a processor for:
      requesting and downloading a media program from the at least one server via the first interface;
      performing digital rights related communications regarding the media program with the at least one server via the first interface;
      obtaining decryption information from the at least one server;
      decrypting the media program using the decryption information;
      re-encrypting the media program to produce a re-encrypted media program;
      transmitting the re-encrypted media program to a first media player of the plurality of media players via the second interface based on the digital rights related communications;
      tracking presentation of the media program on the first media player and other media players of the plurality of media players; and
      managing billing respective to the presentation of the media program based on the digital rights related communications.

2. The set top box of claim 1, wherein the processor further transcodes the media program based upon video characteristics of the first media player to produce a transcoded media program and re-encrypts the transcoded media program to produce the re-encrypted media program.

3. The set top box of claim 1, wherein the processor further stores the media program in an encrypted format in an external media storage device.

4. The set top box of claim 3, wherein the processor further retrieves the media program from the external media program prior to decrypting the media program, re-encrypting the media program and transmitting the re-encrypted media program to the first media player.

5. The set top box of claim 3, wherein the processor stores the re-encrypted media program in the external media storage device.

6. The set top box of claim 1, wherein the processor further establishes communications with a remote billing server via the first interface, interacts with the remote billing server regarding the digital rights related communications via the first interface, interacts with a user regarding the digital rights related communications via the second interface, and arranges for payment related to the digital rights related communications via the first interface and the second interface.

7. The set top box of claim 6, wherein the processor further manages subsequent billing respective to the presentation of the media program.

8. The set top box of claim 1, wherein the digital rights related communications indicate a number of times that the media program may be presented by any of the plurality of media players.

9. The set top box of claim 1, wherein the processor stores a respective personal key for each of the media players and re-encrypts the media program to produce the re-encrypted media program using the personal key of the first media player.

10. The set top box of claim 1, wherein the processor further provides a web page interface via the second interface to a user through a select one of the plurality of media players, the web page interface enabling the user to interact with the at least one server.

11. The set top box of claim 10, wherein the processor further enables the user to select the media program from the at least one server for downloading via the web page interface.

12. A method for managing media consumption within a home entertainment network, the method comprising:
 a set top box:
  communicating with the at least one server via the Internet;
  requesting and downloading a media program from the at least one server;
  performing digital rights related communications regarding the media program with the at least one server;
  obtaining decryption information from the at least one server;
  decrypting the media program using the decryption information;
  re-encrypting the media program to produce a re-encrypted media program;
  transmitting the re-encrypted media program to a first media player of a plurality of media players within the home entertainment network based on the digital rights related communications;
  tracking presentation of the media program on the first media player and other media players of the plurality of media players; and
  managing billing respective to the presentation of the media program based on the digital rights related communications.

13. The method of claim 12, further comprising:
 transcoding the media program based upon video characteristics of the first media player to produce a transcoded media program; and
 re-encrypting the transcoded media program to produce the re-encrypted media program.

14. The method of claim 12, further comprising:
 storing the media program in an encrypted format in an external media storage device.

15. The method of claim 14, further comprising:
 retrieving the media program from the external media program prior to decrypting the media program, re-encrypting the media program and transmitting the re-encrypted media program to the first media player.

16. The method of claim 14, further comprising:
 storing the re-encrypted media program in the external media storage device.

17. The method of claim 12, further comprises:
 establishing communications with a remote billing server via the Internet;
 interacting with the remote billing server regarding the digital rights related communications;
 interacting with a user regarding the digital rights related communications via the home entertainment network; and
 arranging for payment related to the digital rights related communications via the Internet and the home entertainment network.

18. The method of claim 17, further comprising:
 managing subsequent billing respective to the presentation of the media program.

19. The method of claim 12, wherein the digital rights related communications indicate a number of times that the media program may be presented by any of the plurality of media players.

20. The method of claim 12, further comprising:
 storing a respective personal key for each of the media players; and
 re-encrypting the media program to produce the re-encrypted media program using the personal key of the first media player.

21. The method of claim 12, further comprising:
 providing a web page interface via the home entertainment network to a user through a select one of the plurality of media players, the web page interface enabling the user to interact with the at least one server; and
 enabling the user to select the media program from the at least one server for downloading via the web page interface.

22. A set top box that interacts with at least one server to manage media consumption within a home entertainment network, the set top box comprising:
 a first interface coupled to the Internet to communicate with the at least one server;
 a second interface coupled to the home entertainment network to communicate with a plurality of media players; and
 a processor for:
  requesting and downloading a media program from the at least one server via the first interface;
  performing digital rights related communications regarding the media program with the at least one server via the first interface;
  obtaining decryption information from the at least one server;
  decrypting the media program using the decryption information;
  re-encrypting the media program to produce a re-encrypted media program;
  transmitting the re-encrypted media program to a first media player of the plurality of media players via the second interface based on the digital rights related communications;
  tracking presentation of the media program on the first media player and other media players of the plurality of media players; and
  managing billing respective to the presentation of the media program based on the digital rights related communications;

wherein the digital rights related communications includes usage restriction information and the processor further transmits the re-encrypted media program to the first media player only upon a positive evaluation of the usage restriction information.

23. The set top box of claim 22, further comprising:
a tamper proof clock set in accordance with the usage restriction information.

\* \* \* \* \*